United States Patent
Sasakura

(10) Patent No.: US 8,599,395 B2
(45) Date of Patent: Dec. 3, 2013

(54) PRINTING DEVICE, PRINTING CONTROL METHOD AND RECORDING MEDIUM

(75) Inventor: Miyoshi Sasakura, Higashiyamato (JP)

(73) Assignees: Casio Electronics Manufacturing Co., Ltd., Tokyo (JP); Casio Computer Co., Ltd., Tokyo (JP)

( * ) Notice: Subject to any disclaimer, the term of this patent is extended or adjusted under 35 U.S.C. 154(b) by 153 days.

(21) Appl. No.: 13/233,925

(22) Filed: Sep. 15, 2011

(65) Prior Publication Data

US 2012/0069375 A1    Mar. 22, 2012

(30) Foreign Application Priority Data

Sep. 16, 2010  (JP) ................................. 2010-208222
Apr. 8, 2011   (JP) ................................. 2011-085973

(51) Int. Cl.
*G06F 3/12*         (2006.01)

(52) U.S. Cl.
USPC ....... 358/1.13; 358/1.15; 358/1.16; 358/1.17; 358/1.1; 710/59; 710/260; 710/263

(58) Field of Classification Search
None
See application file for complete search history.

(56) References Cited

U.S. PATENT DOCUMENTS

| | | | | |
|---|---|---|---|---|
| 6,600,569 | B1* | 7/2003 | Osada et al. | 358/1.12 |
| 7,471,406 | B2* | 12/2008 | Tsuchitoi | 358/1.15 |
| 2005/0200889 | A1* | 9/2005 | Oomura | 358/1.15 |
| 2007/0223027 | A1* | 9/2007 | Shindo et al. | 358/1.13 |

FOREIGN PATENT DOCUMENTS

| | | |
|---|---|---|
| JP | 10-177464 A | 6/1998 |
| JP | 11-312062 A | 11/1999 |
| JP | 2004-062815 A | 2/2004 |
| JP | 2005-349768 A | 12/2005 |

OTHER PUBLICATIONS

Japanese Office Action dated Aug. 13, 2013 (and English translation thereof) in counterpart Japanese Application No. 2011-085973.

* cited by examiner

*Primary Examiner* — Hilina K Demeter
(74) *Attorney, Agent, or Firm* — Holtz, Holtz, Goodman & Chick, PC

(57) ABSTRACT

A LAN control unit receives print data from a client device or the like. An input job storage unit registered on a hard disk a series of PDL commands included in the print data received. An input job queue management unit registers print job specifying information specifying a print job represented by the print data received to the end of an input job queue. A PDL interpretation/execution unit successively executes from the head of the series of PDL commands stored on the hard disk device. When it is determined that the PDL command that has been executed is a re-execution unnecessary command, the PDL interpretation/execution unit overwrites the PDL command stored on the hard disk with a NOP command.

19 Claims, 24 Drawing Sheets

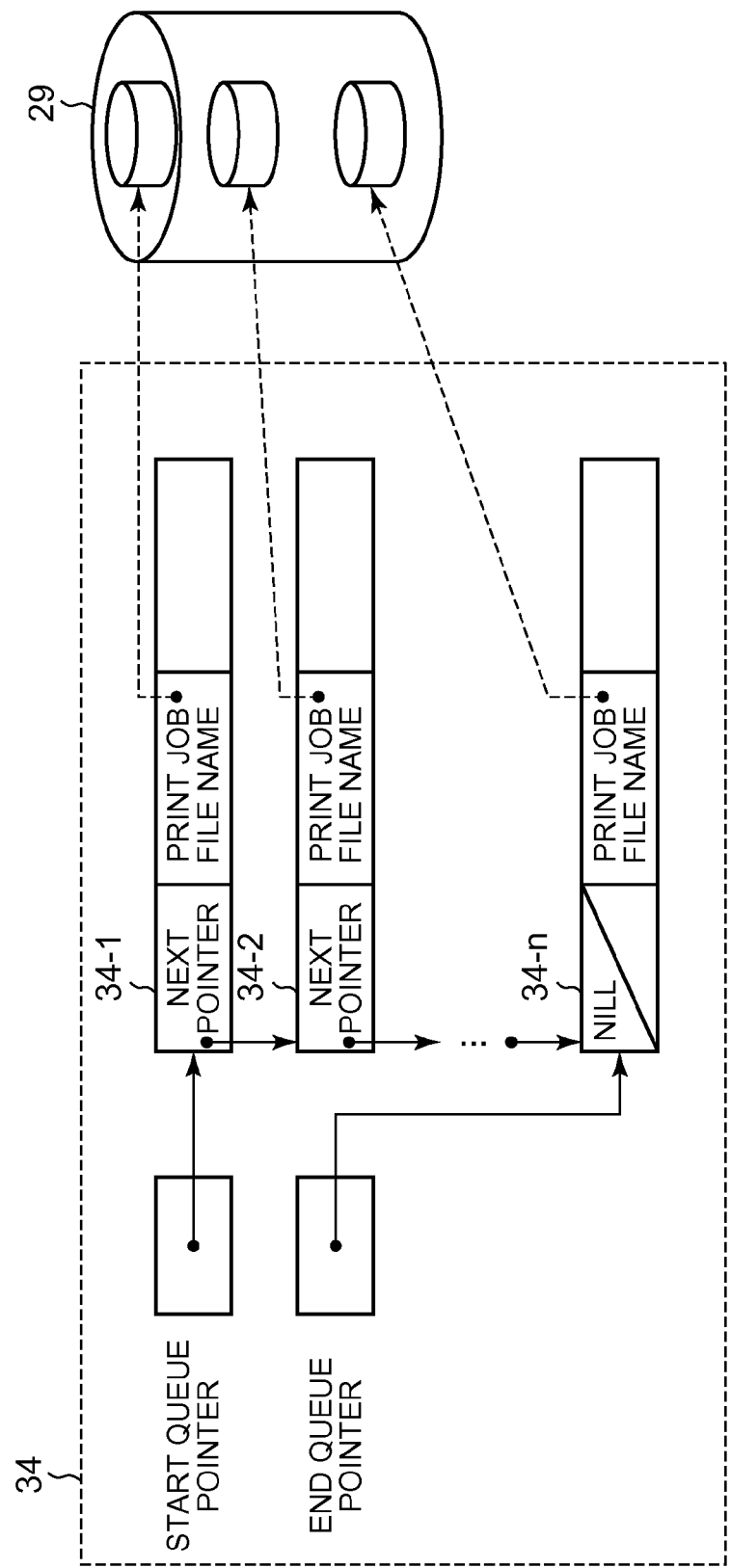

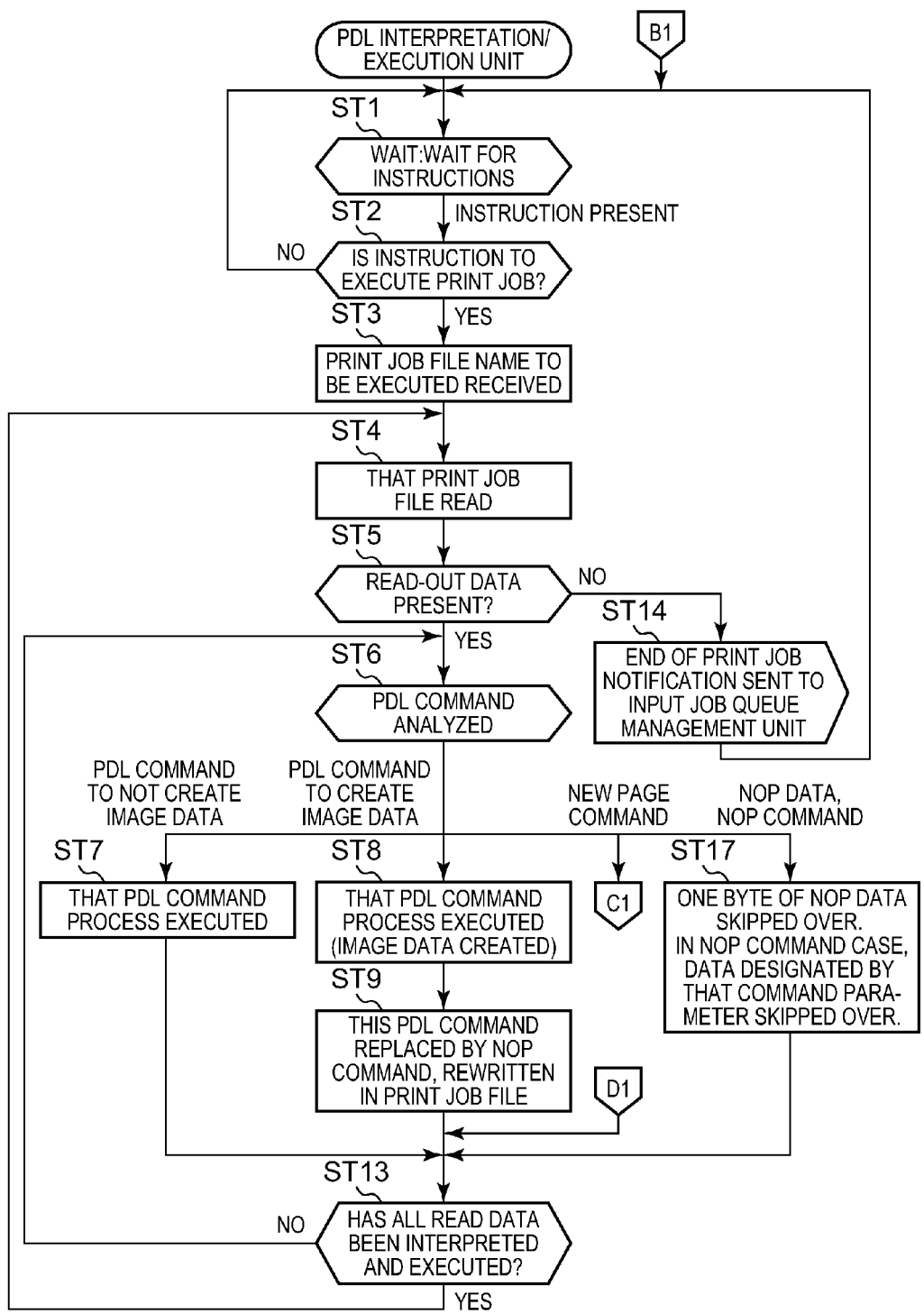

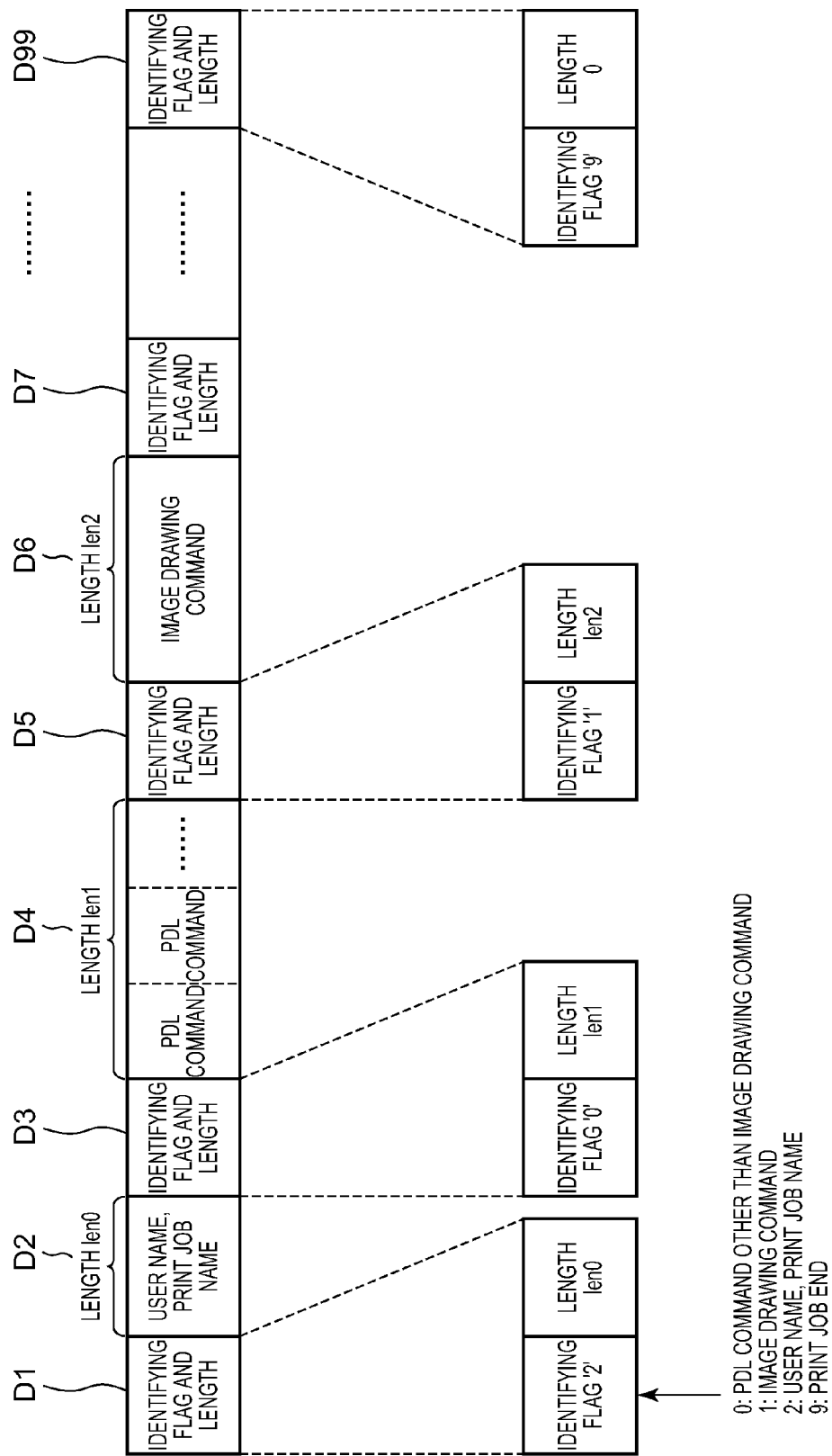

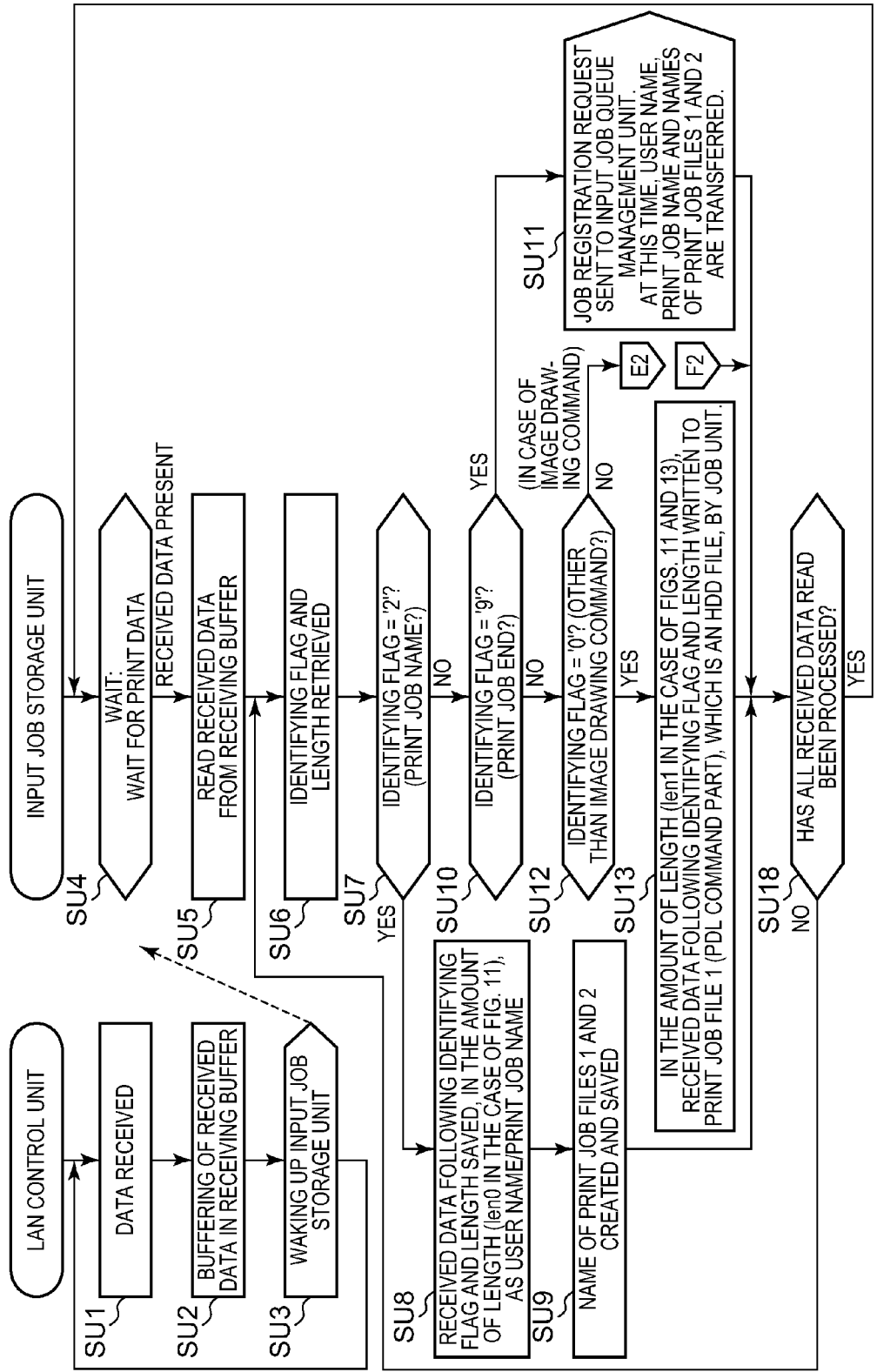

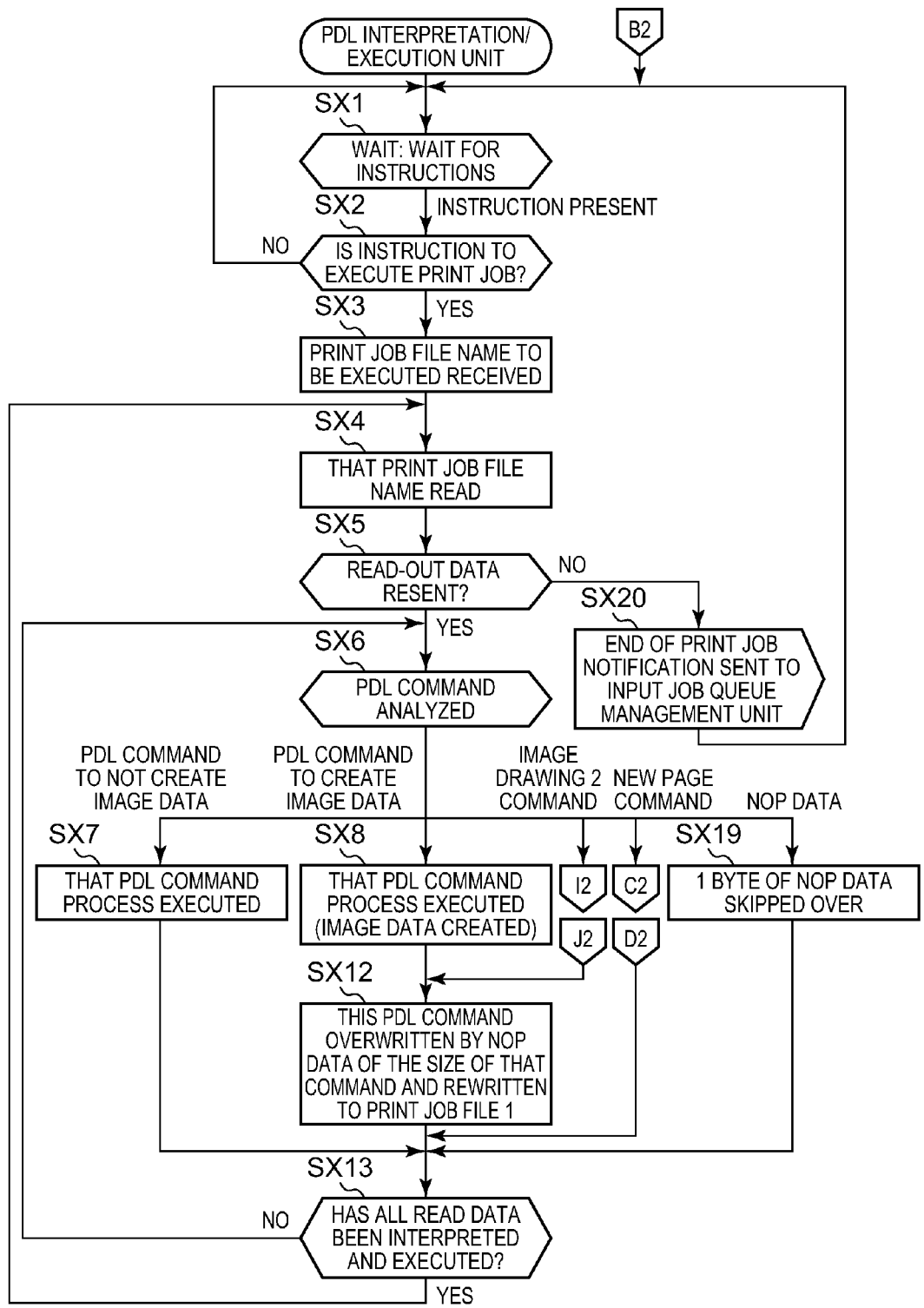

PRINTING DEVICE, PRINTING CONTROL METHOD AND RECORDING MEDIUM

CROSS-REFERENCE TO RELATED APPLICATION

This application claims the benefit of Japanese Patent Application No. 2010-208222, filed Sep. 16, 2010, and Japanese Patent Application No. 2011-085973, filed Apr. 8, 2011, the entire disclosures of which are incorporated by reference herein.

FIELD

This application relates generally to a printing device, a printing control method and a recording medium, capable of interruption printing.

BACKGROUND

Today, printing systems are utilized in which host equipment (a client device) such as a host computer and printing devices such as single-function printing devices and so-called all-in-one printing devices are connected via a network. In such a system, there is a high probability that while a print job requested from host equipment with a printing device is being processed, the next print job from different host equipment will be supplied to this printing device.

When print jobs compete, control is possible that does not accept processing of other print jobs until print processing of the first-arrived print job is concluded. However, in this case when the print system is viewed as a whole, efficiency declines and the system has poor user-friendliness. That is to say, while a print job requiring time until printing is completed is being processed first, print processing must wait even for small-volume print jobs needing short printing times. Consequently, when the printing system is considered as a whole, this is a system with poor efficiency as the number of print jobs in a waiting-to-print status increases.

In addition, users must wait a long time until print processing is completed when a print job requiring considerable time until the end of printing is processed first even when the desire is to urgently accomplish printing.

In consideration of the above problem, Unexamined Japanese Patent Application KOKAI Publication No. H10-177464 (hereafter referred to as "Patent Literature 1") and Unexamined Japanese Patent Application KOKAI Publication No. H11-312062 (hereafter referred to as "Patent Literature 2") have been disclosed. Even these Patent Literatures are inventions of printing devices having interruption processing for jobs during print processes, interruption printing process of urgent print jobs, a reinstatement process for interrupted print jobs and an interruption printing function for executing restarted print processes for interrupted print jobs.

First, Patent Literature 1 discloses a printing control device having two operation modes, namely a normal mode in which print jobs described in non-page-independent Page Description Language (hereafter called "PDL") received from a client device are stored in memory, each page of images is created in succession, and the created images are supplied to the printing device and printed, and a non-printing mode in which images are not supplied to the printing device, such that when printing is suspended, a printing restart page is calculated, and when a printing restart signal is received at the time of restarting printing, the suspended print job is processed from the beginning with reference to the job memory unit, and the device operates in non-printing mode until the printing restart page is reached and operates in normal mode from the printing restart page on.

In addition, Patent Literature 2 discloses an invention wherein the method of restarting an interrupted print job is to store the input job data, interpret from the start the suspended print job data when restarting, and to execute print requests for each page, but redundant printing is prevented by adopting a method in which print requests relating to pages already printed are invalid and only print requests for unprinted pages are valid.

However, with both devices, input print jobs are stored and when an interruption request is generated, the job currently being printed is interrupted at the end of a page, and the number of pages already printed or the number of the page to be restarted are stored, and after the interruption process of the print job is accomplished, interruption printing is executed. Moreover, with both devices, when interruption printing ends, command interpretation from the head of the interrupted print job is executed, and a reinstatement/restart process is executed that restarts the print process from the unprinted pages without executing printing of pages already printed. In this print job reinstatement/restart process, because command interpretation is executed from the head of the interrupted print job and a print image is created, the interpretation execution and print image creation are accomplished even for pages that have already been printed and output, requiring a long time until resumption of the print process.

Consequently, when the interruption printing function is used, time is needed to reinstate the interrupted print job, and as a result this becomes an impediment when using the interruption print function. Accordingly, a printing device is desired that is capable of accomplishing in a short time a reinstatement/restart process from when execution of the interruption printing process ends until printing of the interrupted print job is restarted.

Furthermore, with Patent Literature 1, a method is disclosed in which a PDL command creating an image hard-wise is not executed to shorten job reinstatement time, but in this case, circuit size becomes large and in addition logic composition becomes complex, causing costs to rise. Consequently, a printing device is desired that has a relatively simple structure yet is capable of improving performance during interruption reinstatement.

In consideration of the foregoing problems, it is an object of the present invention to provide a printing device, a print control method and a program, with a relatively simple structure and capable of improving performance during interruption reinstatement.

SUMMARY

In order to achieve the above object, a printing device according to a first aspect of the present invention is a printing device that executes a print job based on print data supplied from electronic equipment connected via a network, and permits interruption by another print job during execution of the supplied print job, the printing device comprising:

a receiver which receives the print data which includes a series of PDL commands from the electronic equipment;

a PDL command registration unit which registers the series of PDL commands included in the received print data into a PDL command memory unit;

a print job control unit which, when the print data is received, registers print job specifying information that specifies the print job represented by the received print data to the end of an input job queue; and a command execution unit which executes the print job by successively executing the series of PDL commands stored in the PDL command memory unit from the head;

wherein each of the series of PDL commands can be classified as either (a) a re-execution necessary command that is necessary to execute again when a print job halted by the interruption process is restarted, or (b) a re-execution unnecessary command that is unnecessary to execute again when a print job halted by the interruption process is restarted;

wherein the command execution unit (a) judges whether the executed PDL command is a re-execution unnecessary command when each of the PDL commands is executed, and (b) overwrites the executed PDL command stored in the PDL command memory unit with a NOP command indicating no processing to be done if the executed PDL command is determined to be a re-execution unnecessary command;

wherein the print job control unit controls the command execution unit to start execution of a print job specified by the print job specifying information at the head of the input job queue when the end of execution of a print job by the command execution unit is detected; and wherein, when an instruction for the interruption process is detected, the print job control unit (a) registers the print job specifying information which specifies the print job for the interruption process into the head of the input job queue, and (b) controls the command execution unit to halt the print job being executed and start execution of the print job for the interruption process.

In order to achieve the above object, a printing control method according to a second aspect of the present invention is a printing control method executed by a printing device that executes a print job based on print data supplied from electronic equipment connected via a network, and permits an interruption process by another print job during execution of the supplied print job, the printing control method comprising:

a receiver step which receives the print data which includes a series of PDL commands from the electronic equipment;

a PDL command registration step which reregisters the series of PDL commands included in the received print data into a PDL command memory unit;

a print job control step which, when the print data is received, registers print job specifying information that specifies the print job represented by the received print data to the end of an input job queue; and a command execution step which executes the print job by successively executing the series of PDL commands stored in the PDL command memory unit from the head;

wherein each of the series of PDL commands can be classified as either (a) a re-execution necessary command that is necessary to execute again when a print job halted by the interruption process is restarted, or (b) a re-execution unnecessary command that is unnecessary to execute again when a print job halted by the interruption process is restarted;

wherein the command execution step (a) judges whether the executed PDL command is a re-execution unnecessary command when each of the PDL commands is executed, and (b) overwrites the executed PDL command stored in the PDL command memory unit with a NOP command indicating no processing to be done if the executed PDL command is determined to be a re-execution unnecessary command;

wherein the print job control step controls to start execution of a print job specified by the print job specifying information at the head of the input job queue when the end of execution of a print job by the command execution step is detected; and wherein, when an instruction for the interruption process is detected, the print job control step (a) registers the print job specifying information which specifies the print job for the interruption process into the head of the input job queue, and (b) controls to halt the print job being executed and start execution of the print job for the interruption process.

In order to achieve the above object, a recording medium according to a third aspect of the present invention is a non-transitory computer-readable recording medium having a program stored thereon for controlling a control unit of a printing device that executes a print job based on print data supplied from electronic equipment connected via a network, and permits interruption by another print job during execution of the supplied print job, wherein the program controls the control unit to function as:

a receiver which receives the print data which includes a series of PDL commands from the electronic equipment;

a PDL command registration unit which registers the series of PDL commands included in the received print data into a PDL command memory unit;

a print job control unit which, when the print data is received, registers print job specifying information that specifies the print job represented by the received print data to the end of an input job queue; and a command execution unit which executes the print job by successively executing the series of PDL commands stored in the PDL command memory unit from the head;

wherein each of the series of PDL commands can be classified as either (a) a re-execution necessary command that is necessary to execute again when a print job halted by the interruption process is restarted, or (b) a re-execution unnecessary command that is unnecessary to execute again when a print job halted by the interruption process is restarted;

wherein the command execution unit (a) judges whether the executed PDL command is a re-execution unnecessary command when each of the PDL commands is executed, and (b) overwrites the executed PDL command stored in the PDL command memory unit with a NOP command indicating no processing to be done if the executed PDL command is determined to be a re-execution unnecessary command;

wherein the print job control unit controls the command execution unit to start execution of a print job specified by the print job specifying information at the head of the input job queue when the end of execution of a print job by the command execution unit is detected; and wherein, when an instruction for the interruption process is detected, the print job control unit (a) registers the print job specifying information which specifies the print job for the interruption process into the head of the input job queue, and (b) controls the command execution unit to halt the print job being executed and start execution of the print job for the interruption process.

With the present invention, it is possible to achieve a relatively simple structure and to improve performance during interruption reinstatement.

BRIEF DESCRIPTION OF THE DRAWINGS

A more complete understanding of this application can be obtained when the following detailed description is considered in conjunction with the following drawings, in which:

FIG. 6 shows the data composition of the input job queue;

FIGS. 7A and 7B are flowcharts showing processes executed by the PDL interpretation and execution unit;

FIG. 11 shows the data format of print data;

FIG. 12A is a flowchart showing processes executed by the LAN control unit and input job storage unit;

FIGS. 16A, 16B and 16C are flowcharts showing processes executed by the PDL interpretation and execution unit;

DETAILED DESCRIPTION (Embodiment 1)

Below, the preferred embodiments of the present invention are described with reference to the drawings.

Figure 2:
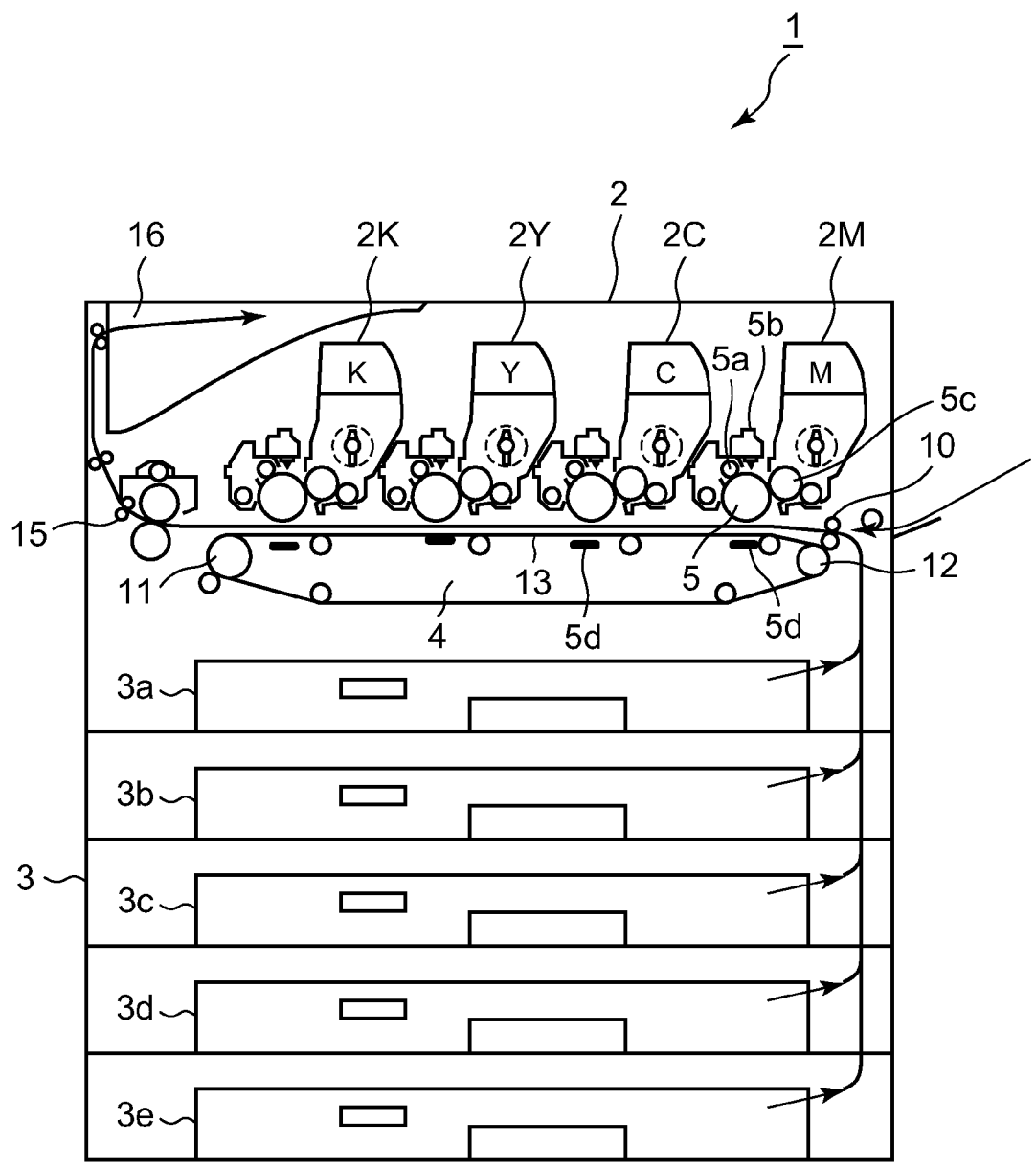
FIG. 2 is a summary cross-section of a printing device according to the first embodiment.

FIG. 2 is a summary cross-section showing an example of a color printer (hereafter indicated as "printing device") of electronic photo format with for example four-head tandem composition as a printing device explaining the present embodiment.

As shown in this figure, an engine part of a printing device 1 is composed of an image creation unit 2, recording medium paper supply unit 3 and a recording medium conveyor unit 4. The image creation unit 2 is composed of image creation units 2M, 2C, 2Y and 2K for magenta (M), cyan (C), yellow (Y) and black (K), which are arranged in succession along the paper conveyor direction, maintaining a predetermined spacing.

Each of the image creation units 2M, 2C, 2Y and 2K has a photosensitive drum 5, a charged body 5a positioned surrounding the photosensitive drum 5, a print head (LED head) 5b, a developer 5c and a transfer unit 5d, and creates an image on paper in accordance with an electronic photography process. The electronic photography process repeats the various processes of charging, exposure, developing, transferring and cleaning, and is a process for creating an image on a paper (recording medium). Specifically, a uniform electrical charge is applied to the surface of the photosensitive drum 5 using electrification, an electrostatic latent image is created on the surface of the photosensitive drum 5 by exposure, a toner image is created in accordance with the electrostatic latent image through developing, the toner image is transferred to paper through transfer, and the toner image transferred to the paper is fused to the paper through a fusing process.

The recording medium paper supply unit 3 is composed of recording medium paper supply units 3a to 3e arranged in levels vertically. On the other hand, paper supplied from any of the recording medium paper supply units 3a to 3e is sent to the recording medium conveyor unit 4 via a standby roller 10. The recording medium conveyor unit 4 is composed of a belt-driven roller 11, a following roller 12 and a conveyor belt 13. The conveyor belt 13 rotates as a result of drive power from the belt-driven roller 11 and sends to the image creation unit 2 paper sent to the conveyor belt 13 with timing synchronized by the standby roller 10.

Corresponding toner is successively transferred by the above-described image creation units 2M, 2C, 2Y and 2K to the paper sent to the image creation unit 2. The toner image transferred to the paper is fused by the fuser 15. Following this, the paper is sent to a paper discharge unit 16.

The above-described units accomplish printing control that is optimum for the paper by setting a printer engine operating mode such as transfer speed (conveyor speed), transfer bias and fusing temperature based on paper quality (for example, paper, OHP sheets, etc.), paper weight (for example, thin paper, regular paper, thick paper), paper length (for example, long paper) and the like.

Figure 3:
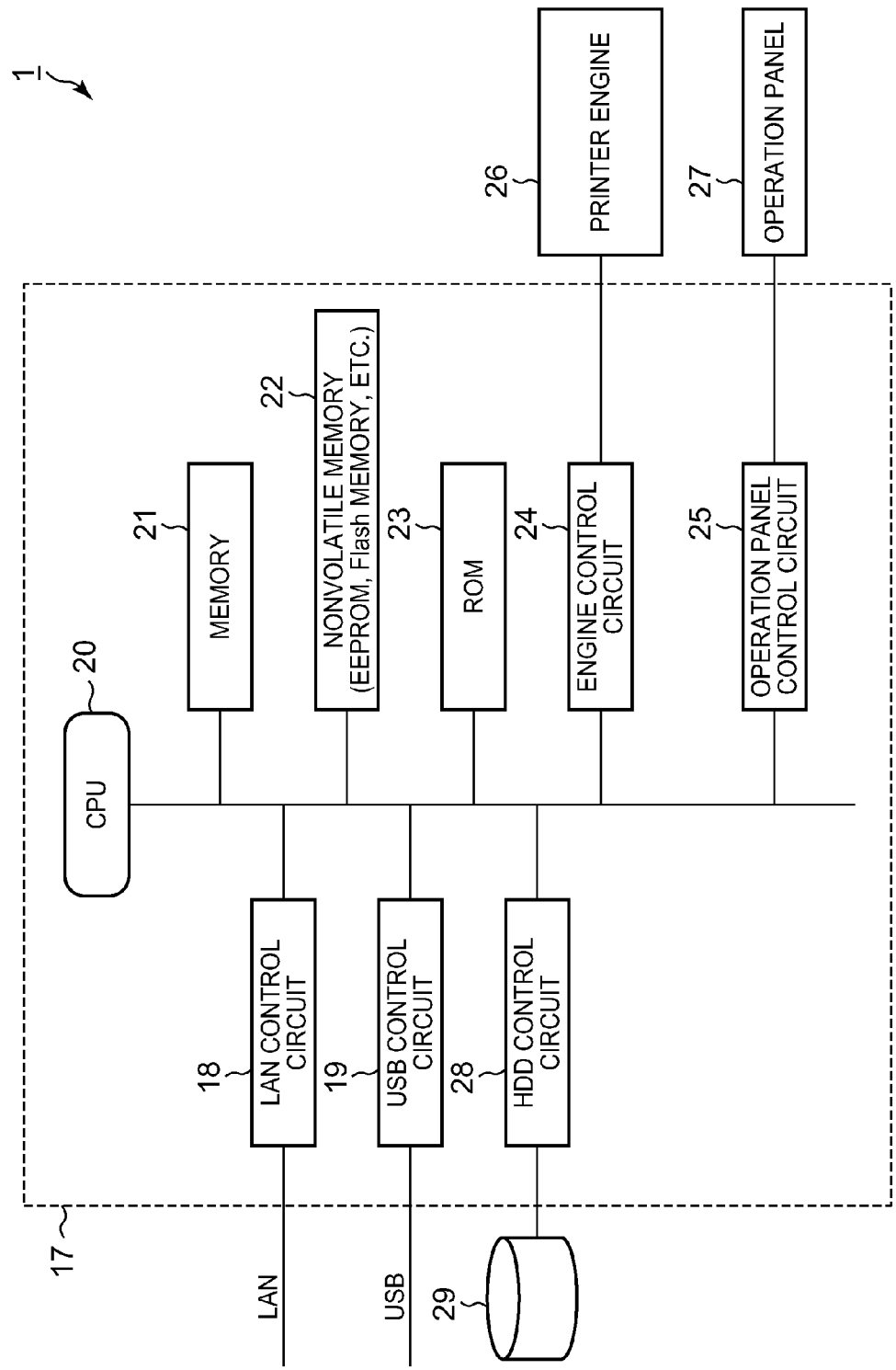
FIG. 3 shows the hardware composition for a printing control unit provided in a printing device according to the first embodiment.

FIG. 3 shows the hardware composition for the printing control unit 17 in the printing device 1 having the above composition. The printing control unit 17 is composed of a LAN control circuit 18, a USB control circuit 19, a CPU 20, memory 21, nonvolatile memory 22, ROM 23, an engine control circuit 24, an operation panel control circuit 25 and a hard disk control circuit (hereafter indicated as the "HDD control circuit") 28.

In addition, a printer engine 26 is connected to the engine control circuit 24, an operation panel 27 is connected to the operation panel control circuit 25 and a hard disk 29 is connected to the HDD control circuit 28.

Figure 4:
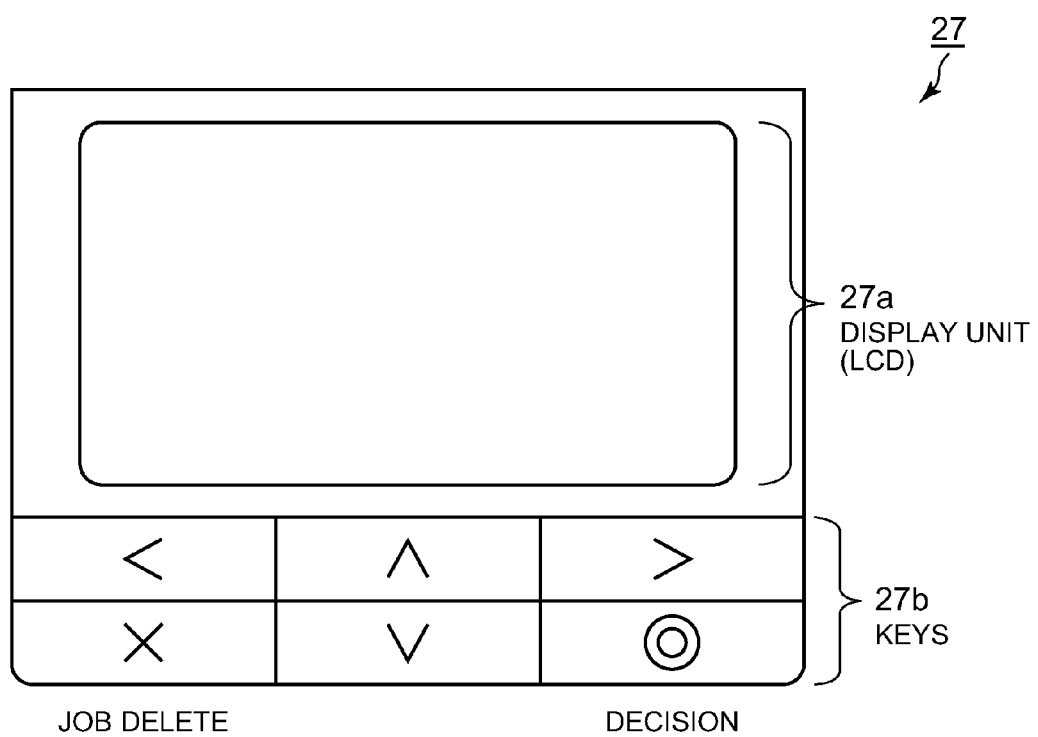
FIG. 4 shows the composition of an operation panel.

FIG. 4 shows the composition of the operation panel 27, and the operation panel is composed of a display unit 27a and a key unit 27b. On the display unit 27a, print job information for print execution underway or print execution standby read from a below-described input job queue is displayed. In addition, operation signals supplied from the key unit 27b based on user operation are sent to the CPU 20 via the operation panel control circuit 25.

Figure 1:
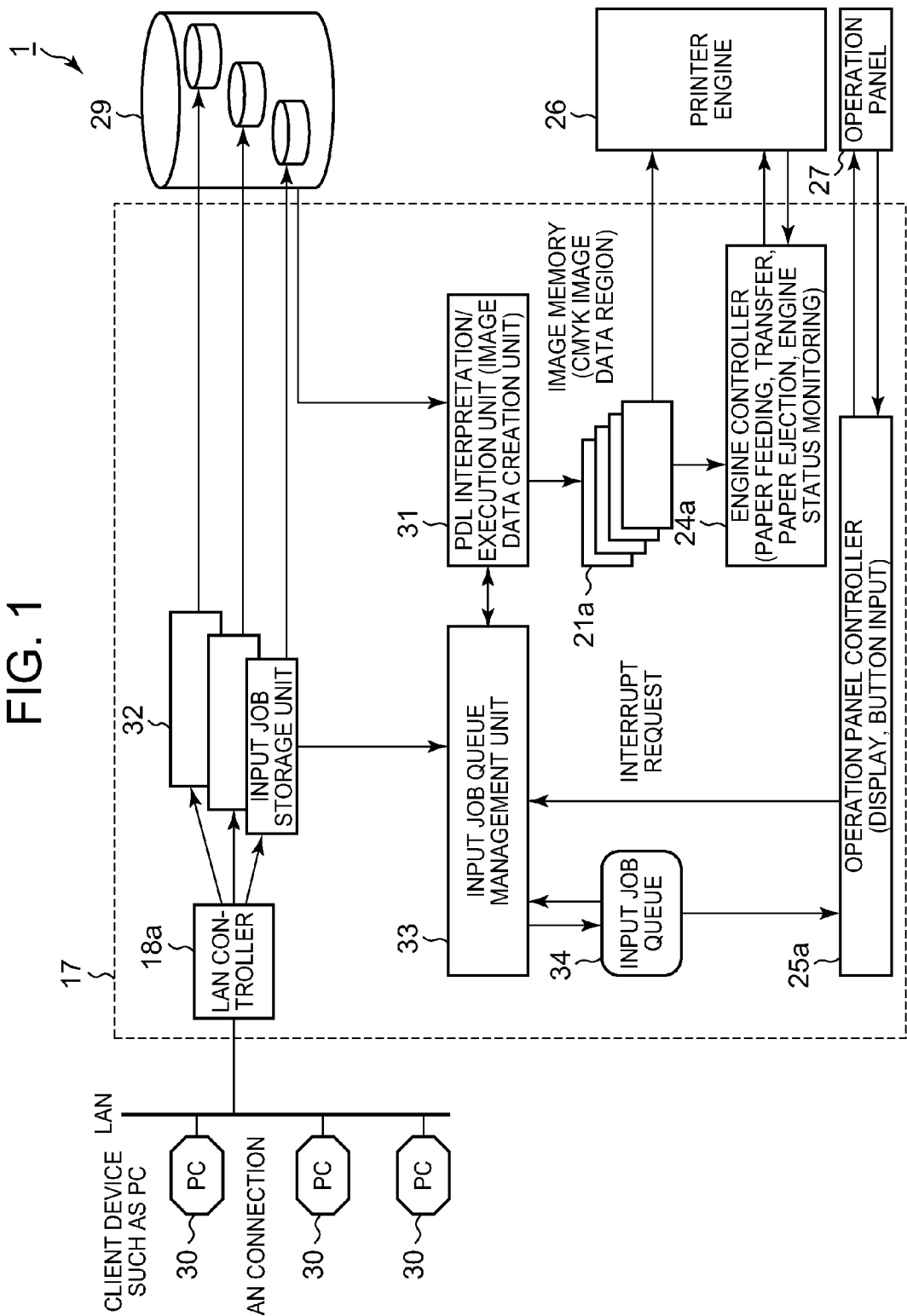
FIG. 1 shows the software composition for a printing control unit provided in a printing device according to a first embodiment.

On the other hand, FIG. 1 shows the software composition of the above-described printing control unit 17, and functional units based on the circuits shown in above-described FIG. 3 are described using related numbers. The printing device 1 (printing control unit 17) of the present embodiment is connected to a client device (host equipment) 30 such as a personal computer (PC) or the like via a LAN (Local Area Network). The client device 30 is composed, for example, of an application program, a printer driver, a spooler and a LAN connection control unit.

The client device 30 converts print data created in accordance with the application program into intermediate data including the above-described PDL command through the printer driver, retains this in the spooler and outputs this to the printing device 1 via the LAN connection control unit.

The print data output from the client device 30 is input to the printing device 1 via the above-described LAN control circuit 18 (LAN control unit 18a).

As noted above, the printing device 1 is equipped with an engine control unit (printer engine control unit) 24a corresponding to the engine control circuit 24, an operation panel control unit 25a corresponding to the operation panel control circuit 25 and an image memory 21a corresponding to the memory 21. The printing device 1 is further equipped with a PDL interpretation/execution unit that controls the CPU 20 through a program stored in the ROM 23, interprets the print data and executes printing; an input job storage unit 32 that executes an input job storage process; and an input job queue management unit 33 that accomplishes processing of the input job queue 34.

In addition, the engine control unit 24a corresponding to the above-described engine control circuit 24 sets the printer engine operation mode and the like for the printer engine 26 and executes control of a paper supply process, a transfer process for image data from the image memory 21a and a paper discharge process. In addition, the engine control unit 24a monitors the engine status intermittently for a set interval, acquires from each paper feed section the status of the paper feed section and monitors the status of each paper feed section. Information that can be obtained from the paper feed sections is information indicating for example whether or not a cassette is installed, the set condition or withdrawn condition of the cassette, the presence or absence of paper, and paper size.

In addition, an input job queue 34 is composed on the above-described nonvolatile memory 22 or the hard disk 29. The composition of the USB control circuit 19 shown in FIG. 3 is not particularly shown in FIG. 1.

In the above composition, the process action of this example is as described below.

Figure 5A:
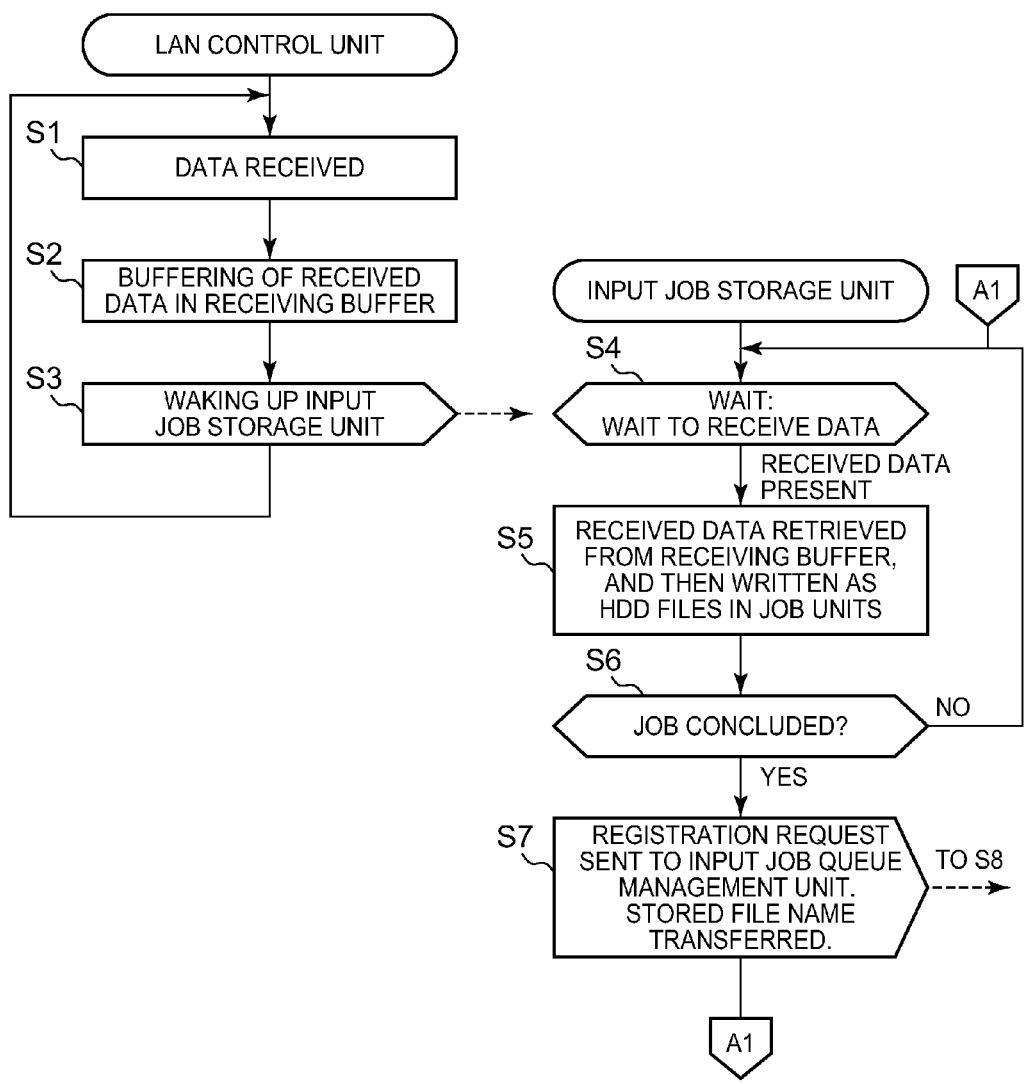
FIG. 5A is a flowchart showing processes executed by the LAN control unit and input job storage unit.
Figure 5B:
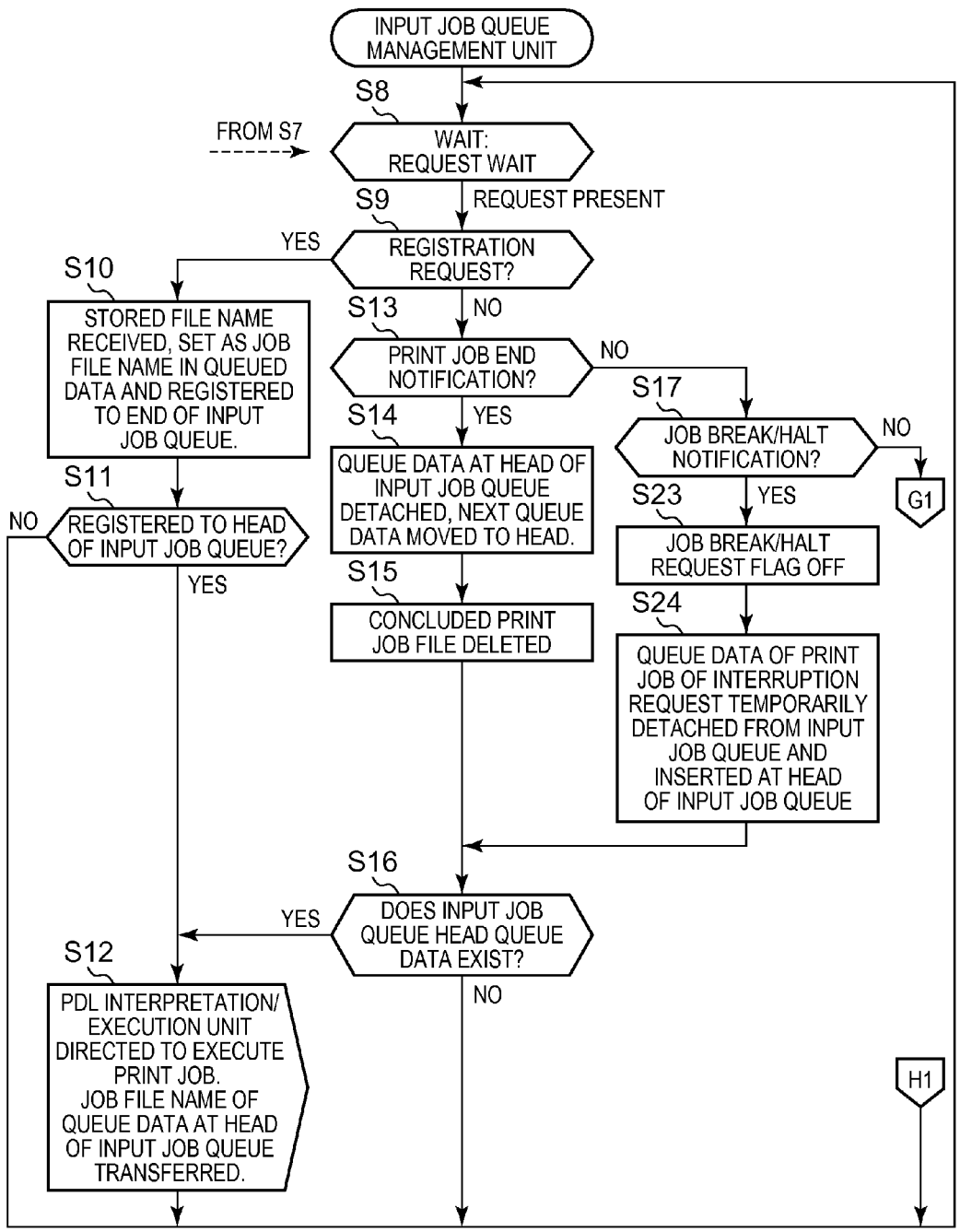
FIGS. 5B and 5C are flowcharts showing processes executed by the input job queue management unit.
Figure 5C:
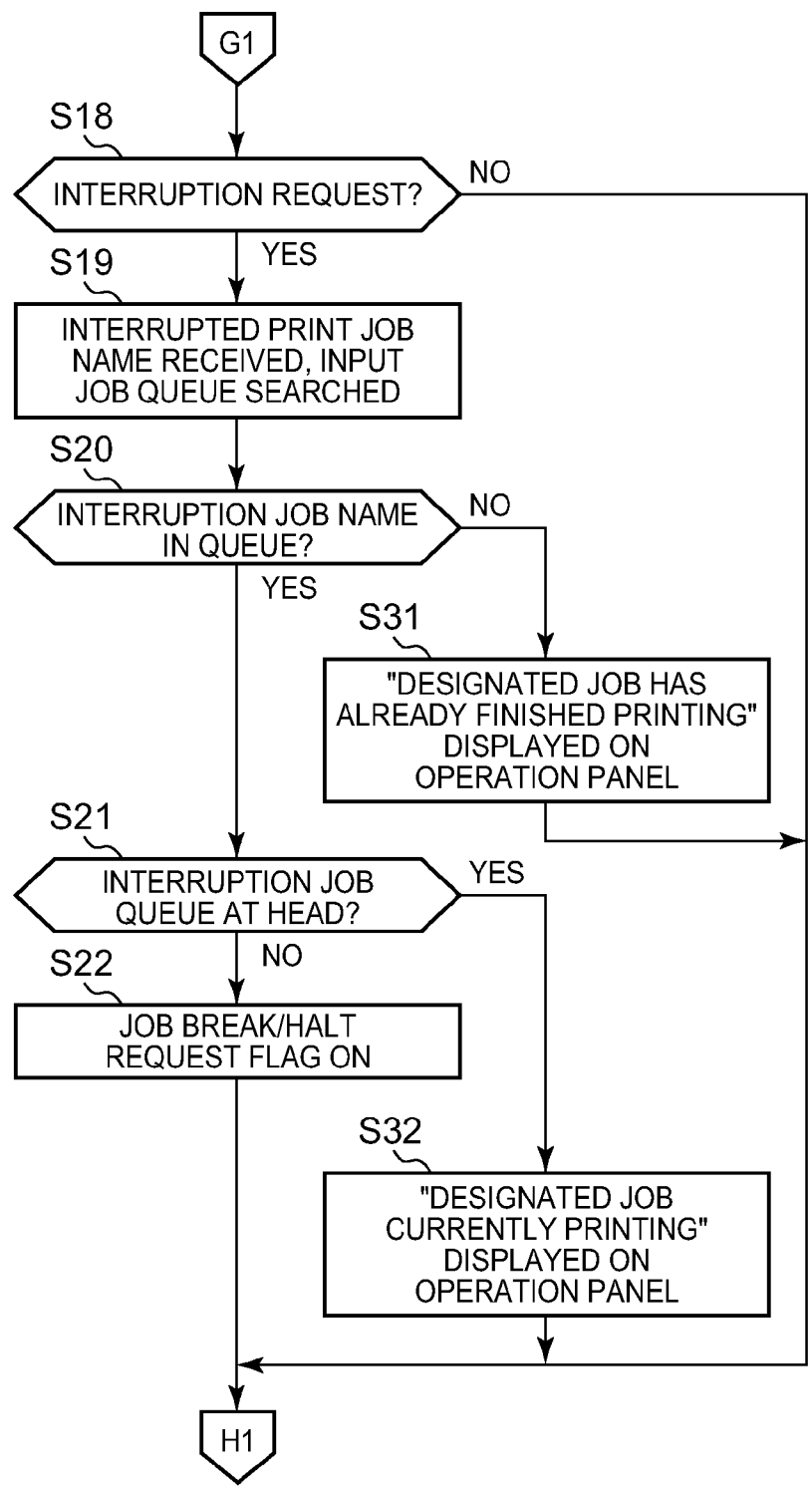

FIGS. 5A, 5B and 5C are flowcharts explaining the process actions the LAN control unit 18a, the input job storage unit 32 and the input job queue management unit 33 execute.

First, the LAN control unit 18a, upon receiving print data output from the client device 30 (step (hereafter indicated by "S") 1), buffers the print data in a receiving buffer (S2). The receiving buffer is set for example in a designated area of the above-described memory 21.

Next, the LAN control unit 18a notifies the input job storage unit 32 of print data input and wakes up the input job storage unit 32 (S3).

The input job storage unit 32 waiting to receive print data, upon receiving notification from the LAN control unit 18a as noted above, begins a process, retrieves the print data stored in the receiving buffer, and successively writes to the above-described hard disk 29 in print job units (S4, S5).

Following this, the input job storage unit 32 determines whether all data from the print job output from the client device 30 and stored in the receiving buffer has been written to the hard disk 29 (S6), and until all data from the print job has been written to the hard disk 29, repeats the above process (S6: No, S4-S6). Furthermore, when all writing processes have been completed for the print job (S6: Yes), the input job storage unit 32 outputs a print job registration request to the input job queue management unit 33 (S7). At this time, the file name of the print job recorded on the hard disk 29 is transferred to the input job queue management unit 33. The print job file name is a unique name automatically created by the input job storage unit 32.

The input job queue management 33 waits in a request standby situation (S8), and when there is access from the input job storage unit 32, determines whether this is a registration request (S9). Here, when the input job queue management unit 33 determines that this is a registration request from the input job storage unit 32 (S9: Yes), the input job queue management unit 33 receives the above print job file name information, sets this in the job file name of the input job queue 34 and registers this to the end of the input job queue 34 (S10).

FIG. 6 shows the composition of data in the input job queue 34. The start queue pointer links to the first print job information 34-1. In other words, the start queue pointer indicates the lead address of the first print job information 34-1. The next pointer of the first print job information 34-1 indicates the next print job information 34-2, and the next print job information 34-n is indicated in accordance with the designation of successive next pointers after that. In other words, the next pointer of the print job information 34-i (where i is an integer satisfying 1≤i<n) indicates the lead address of the print job information 34-(i+1). In each print job information 34-1 to 34-n, the above-described print job file is recorded.

Next, the input job queue management unit 33 determines whether the above-described print job file name has been registered to the head of the input job queue 34 (S11). When this has been registered to the head of the input job queue 34 (S11: Yes), the input job queue management unit 33 instructs the PDL interpretation/execution unit 31 to execute the print job (S12). At this time, the input job queue management unit 33 transfers the print job file name information to the PDL interpretation/execution unit 31.

Figure 7B:
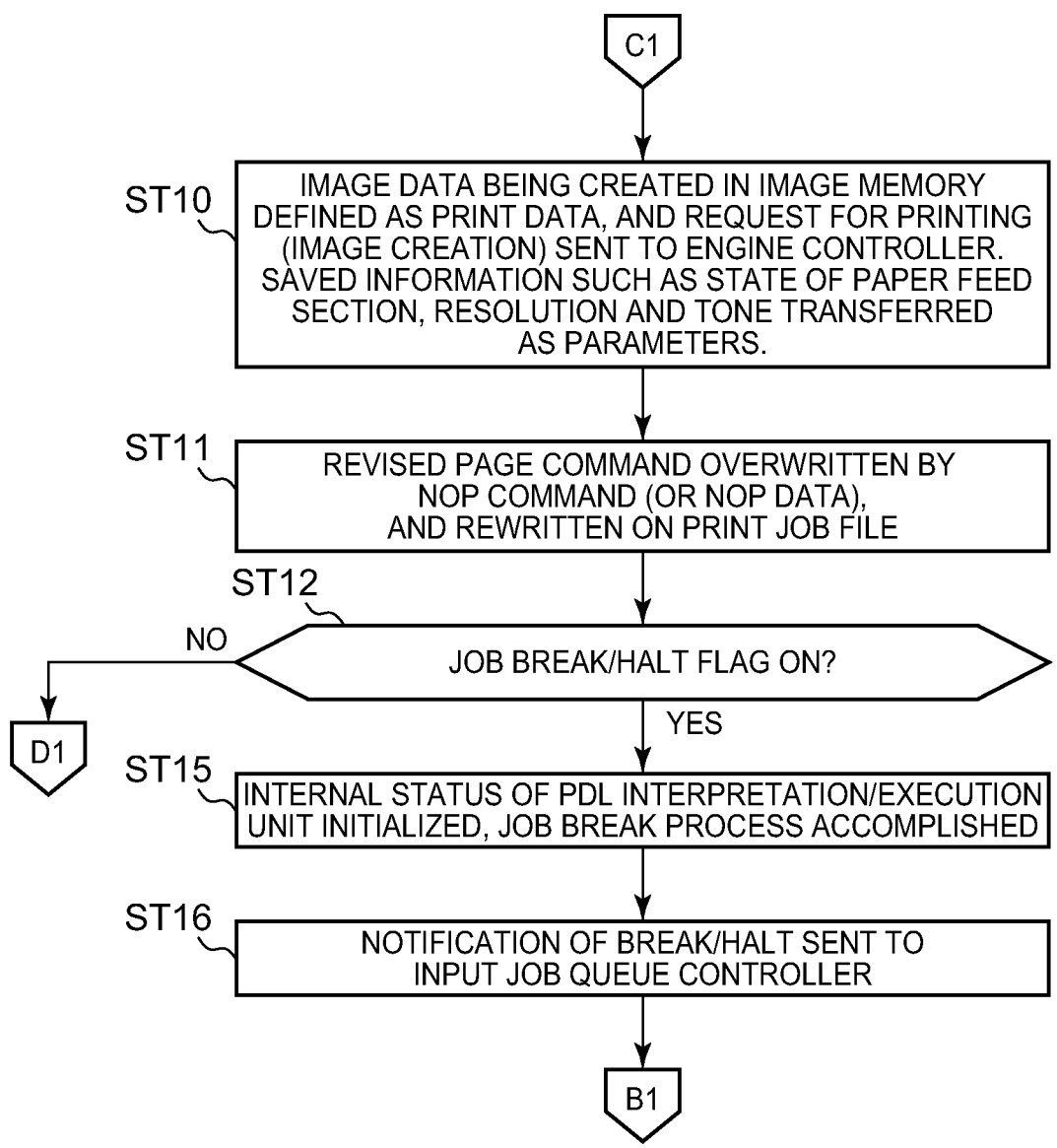

FIGS. 7A and 7B are flowcharts explaining the process executed by the PDL interpretation/execution unit 31. The PDL interpretation/execution unit 31 waits in a request wait state (step (hereafter indicated by "ST") 1) and when there is a print job execution order (ST2), the PDL interpretation/execution unit 31 receives information about the print job file name transferred from the input job queue management unit 33 (ST3).

Next, the PDL interpretation/execution unit 31 retrieves information on the transferred print job file (ST4). Furthermore, the PDL interpretation/execution unit 31 determines whether or not there is retrieved data (ST5). When the determination is that there is retrieved data in the print job file in this first determination (ST5: Yes), the PDL interpretation/execution unit 31 accomplishes analysis of the PDL command stored in the print job file (ST6).

To start with, the PDL interpretation/execution unit 31 executes the command process without change for PDL commands that do not create image data, for example PDL commands such as state of paper feed section, resolution and gradation information and like necessary when accomplishing the print process (ST7). In addition, the PDL interpretation/execution unit 31 executes the command process without change for PDL commands that create image data also (ST8).

Figure 8:
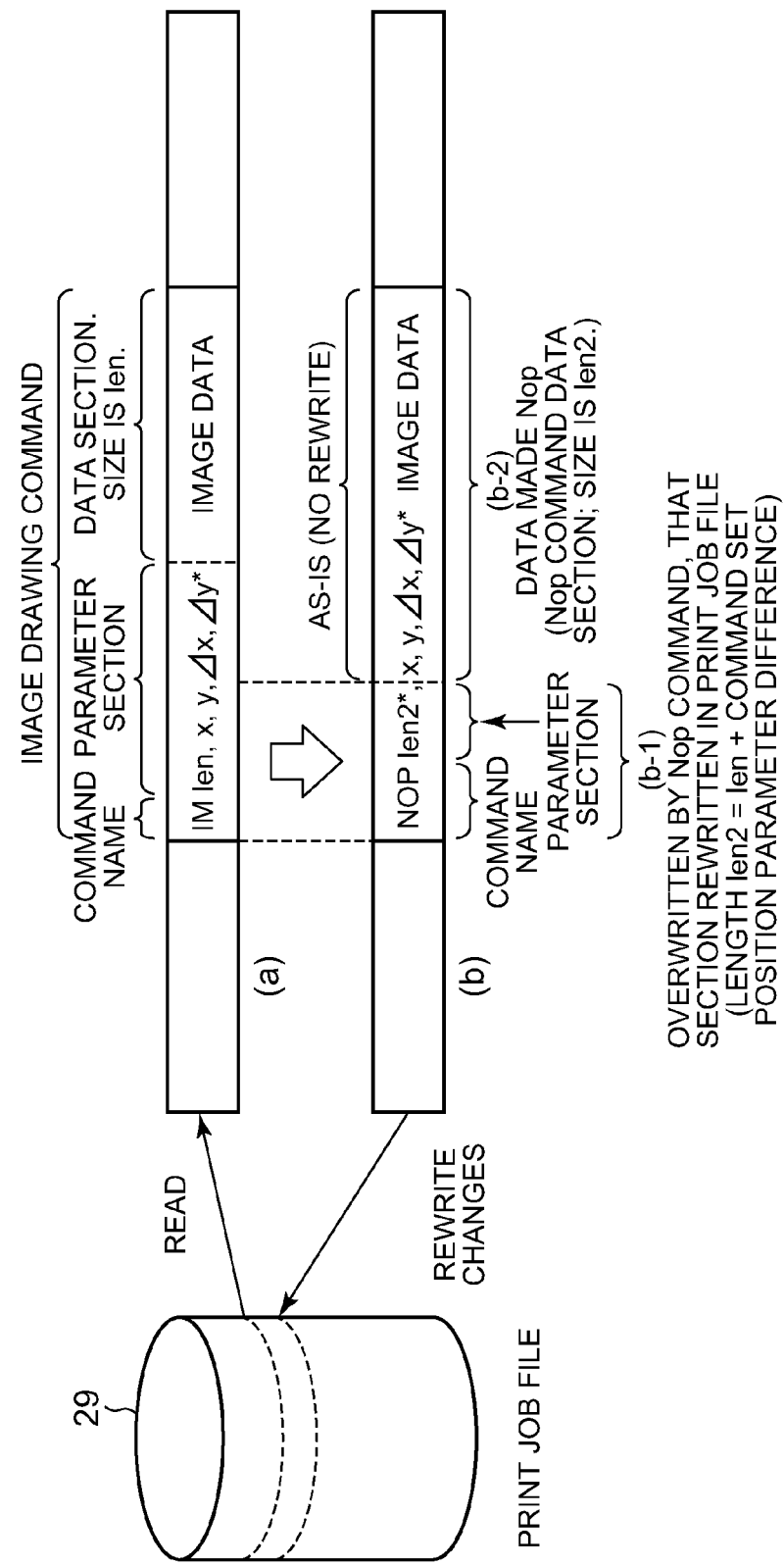
FIG. 8 shows a portion of the data format of print data and a portion of the data format of print data replaced by an NOP command.

FIG. 8 is a drawing showing a portion of the data format of the print data, and is a drawing showing the composition of a command that creates image data. Part (a) in FIG. 8 shows a portion of the data format of the print data. As an example, an image drawing command is cited. Commands that create image data include image drawing commands; text drawing commands; graphics drawing commands for lines, circles and the like; and commands indicating coordinates for drawing. The PDL interpretation/execution unit 31 also executes this command process without change for PDL commands that create image data.

Next, the PDL interpretation/execution unit 31 replaces the above-described PDL command with a NOP (No Operation) command and writes this back to the same print job file on the hard disk 29 (ST9). The PDL interpretation/execution unit 31 for example replaces "IM len" shown in part (a) of FIG. 8 with the NOP command "NOP len2" showing in part (b) of the same figure (b-1), and writes this back to the same position of the same print job file on the hard disk 29. The PDL interpretation/execution unit 31 leaves the remaining parameter portion in the command that creates image data and the data portion (b-2) unchanged without changing such and without need to write this back. In addition, the PDL interpretation/execution unit 31 writes back so as to not exceed the size of the original PDL command. The PDL interpretation/execution unit 31 writes a PDL command shorter than the minimum size of the NOP command to the print job file, replacing the original PDL command size of NOP data (one byte of data, with a value 0x00).

Next in the case of a new page command, the PDL interpretation/execution unit 31 defines the image data being created in the image memory 21a as print data, instructs the engine control unit 24a to execute a print process and simultaneously transfers the above-described information of state of paper feed section, resolution and gradation information as parameters (ST10). In addition, the PDL interpretation/execution unit 31 replaces the new page command with a NOP command and writes this to the same print job file on the hard disk 29 (ST11).

Next, the PDL interpretation/execution unit 31 determines whether or not the job interruption/halt flag is on (ST12), and if the job interruption/halt flag is not on (ST12: No), determines that not all retrieved data has been interpreted and repeats the above-described processes (ST13: No; ST6-ST13).

Following this, when the PDL interpretation/execution unit 31 has interpreted all of the retrieved data (ST13: Yes, ST5: No), notification of the end of the print job is set to the input job queue management unit 33 (ST14). Upon receiving notification of the end of the print job from the PDL interpretation/execution unit 31 (ST13: Yes), the input job queue management unit 33 detaches the head queue data of the input job queue 34 and makes the next queue data the head (S14). Furthermore, the input job queue management unit 33 deletes the print job file of the completed print job (S15).

Furthermore, the input job queue management unit 33 determines whether or not there is head queue data in the input job queue 34 (S16), and when there is queue data at the head of the input job queue 34 (S16: Yes), the PDL interpretation/execution unit 31 is instructed to execute a print job the same as before (S12) and the above-described print process of the PDL interpretation/execution unit 31 is repeated.

Figure 9:
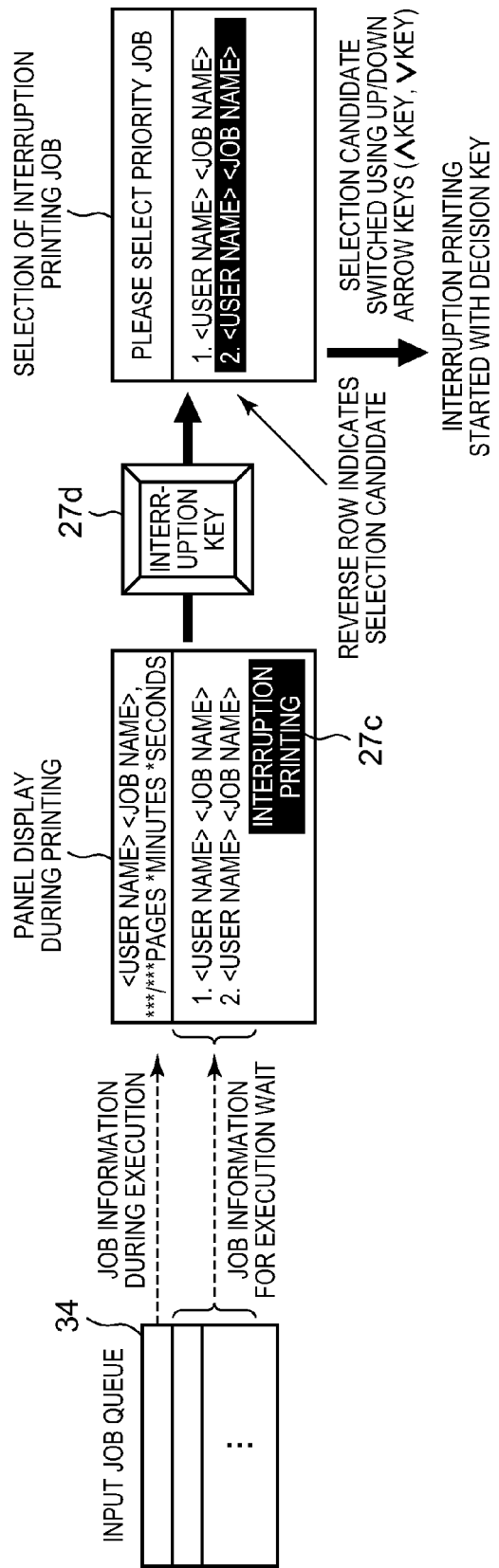
FIG. 9 shows a display panel display example.

On the other hand, during the above-described printing processes, information recorded in the input job queue 34 is displayed on the operation panel 27. FIG. 9 shows an example of the print job information recorded in the input job queue 34 displayed on the operation panel 27. As shown in this figure, the print job name and user name of the job being printed and the print job name and user name of the job in print execution standby are displayed on the operation panel 27. In addition, in the case of states in which interruption printing is possible, an "interruption printing" mark 27c indicating the possibility of interruption printing is displayed on the operation panel 27.

When an interruption key 27d (substituted by the right arrow key (>) shown in FIG. 4) is pressed in the display state shown in the above-described FIG. 9, the display of the print job name and user name on print standby is reversed, as shown in this figure, and it is possible to select the print job to accomplish interruption printing by the up and down arrow keys (∧, ∨) shown in the above-described FIG. 4 being pressed. In addition, determination of the selected print job can be made by the decision key in the key unit 27b shown in the above-described FIG. 4 being pressed.

When interruption printing is indicated by the above-described operation, an operation signal is supplied as an interruption request from the operation panel 27 to the interruption control unit 33 under the control of the operation panel control unit 25a. When the above-described interruption request is sent (S8, S9: No; S13: No; ST17: No; ST18: Yes), the input job queue management unit 33 receives the print job name information for which the interruption process will be executed and searches the input job queue 34 (S19).

Furthermore, the input job queue management unit 33 determines whether a print job name for which interruption printing was designated exists in the input job queue 34, and when such does not exist (S20: No), "designated job has already finished printing" is displayed on the operation panel (S31). When queue data with the print job name on which an interruption instruction was accomplished exists (S20: Yes), the input job queue management unit 33 determines whether the queue of this print job name is the head queue data (S21). When the queue data of this print job name is the head (S21: Yes), the input job queue management unit 33 displays "designated job is currently printing" on the operation panel because this job is currently printing, and because there is no particular need to accomplish an interruption process, the current printing continues without change (S32).

When it is determined that the queue data of this print job name is not at the head (S21: No), the input job queue management unit 33 turns the job interruption/halt request flag on (S22) and waits for interruption of the job (S8).

When the job interruption/halt request flag has been turned on, the PDL interpretation/execution unit 31, which is engaged in a print process, initializes the internal state of the PDL interpretation/execution unit 31 because in the above-described determination (ST12), the job interruption/halt request flag is on (ST12: Yes), and interrupts the process of the print job being executed (ST15). In addition, the PDL interpretation/execution unit 31 notifies the input job queue management unit 33 that the continuing print job process has been interrupted (ST16).

When this job interruption/halt notification is given (S17: Yes), the input job queue management unit 33 turns the job interruption/halt request flag off (S23), temporarily removes the queue data of the print job of the interruption request from the input job queue 34, and inserts such at the head of the input job queue 34 (S24).

Following this, the input job queue management unit 33 determines that queue data is at the head of the input job queue 34 (S16: Yes), and the input job queue management unit 33 instructs the PDL interpretation/execution unit 31 to execute the print job, the same as above (S12), and the print process is accomplished by the above-described PDL interpretation/execution unit 31. The print process of this interruption printing is the same as described above and is executed by the PDL interpretation/execution unit 31.

Next, when the above-described interruption printing has concluded (ST13: Yes; ST14, S13: Yes), the input job queue management unit 33 removes the queue data for which interruption printing was accomplished at the head of the input job queue 34 and moves the next queue data to the head (S14). Furthermore, the print job file of the concluded print job is deleted (S15)

Furthermore, the input job queue management unit 33 determines whether there is head queue data in the input job queue 34 (S16), and the information of the print job file interrupted this time is recorded at the head of the input job queue 34 and the below process is accomplished.

That is to say, the PDL interpretation/execution unit 31 first retrieves the information of the print job file the same as above, accomplishes analysis of the PDL command stored in the job file and accomplishes a reinstatement print process. In this case, PDL commands such as information of state of paper feed section, resolution and gradation information and like necessary when accomplishing the print process are included in the print job file the same as described above, and command processing is accomplished without change for this PDL command (ST7).

On the other hand, the PDL interpretation/execution unit 31 skips over size data designated by the parameters of the command, for NOP commands shown in part b of FIG. 8 (ST17). Accordingly, the command to create image data accomplished by the print process in the subsequent print processes and page update commands are overwritten by the NOP command and skipped over.

That is to say, in the reinstatement/restart process for the print job temporarily interrupted, it is possible to skip the NOP command. Accordingly, pages printing of which was already output in the reinstatement/restart process of the print job are overwritten by the NOP command through the above-described process, and it is possible to skip printing data up to the page that has already been printed and output. For pages whose printing has not yet been output in the previous printing process, the NOP command overwrite process is not conducted, and instead the above-described processes (ST8, ST10) are accomplished.

As described above, with the present embodiment it is possible to accomplish a job reinstatement/restart process after an interruption printing process efficiently and in a short time. Accordingly, it is possible to speed up the print job reinstatement process and markedly improve interruption reinstatement performance.

In addition, with the present embodiment, after a PDL command for creating image data is interpreted and executed, this is converted to an NOP command and written to a print job file, but it would also be fine to not use an NOP command and instead overwrite the entire size of the original PDL command with NOP data with a value of 0x00 for one byte data and to write this to the print job file.

In this case, when printing has concluded, the PDL command for creating image data completely disappears and is entirely overwritten with NOP data (value of 0x00) in the print job file on the hard disk. Furthermore, the file is deleted in this state. In other words, information relating to the contents of the printed material on the print job file entirely disappears and the file is deleted in this state. Consequently, even if the hard disk is stolen and the print job file that was deleted is restored by some kind of method by a user with evil intent, information relating to the contents of the printed material is completely gone, so there are absolutely no worries about information leaks.

Thus, in addition to the above-described speeding up of the print job reinstatement process and improvement in interruption reinstatement performance, there are also benefits in terms of security.

However, with the present embodiment, during the print process the size of the original PDL command is overwritten with NOP data and this is written to the print job file. Accordingly, in particular even image drawing commands with large volumes are overwritten with NOP data including that image data, so this becomes overhead, with a high likelihood that this will have an ill effect on printing speed.

Hence, a second embodiment is shown below which resolves this problem, maintains printing speed, speeds up the interruption reinstatement process and further ensures high security.

(Embodiment 2)

In recent years, the importance of security has been proclaimed, so in order to prevent information leaks, it has become necessary not just to delete file management information but also to delete all files even in printing devices. Removal of the file management information is deletion of information for accessing the file inside the hard disk device including intermediate data created during the course of the process and print data in the course of the printing process. On the other hand, complete removal of the file is deletion of the file by accomplishing an overwrite process using specific pattern data on the file in the hard disk device. Below, an example of the present invention applied to a printing device with high security is described.

A second embodiment of the present invention is described below with reference to the drawings. The bulk of the composition of the printing device according to the second embodiment is the same as the composition of the printing device according to the first embodiment. Accordingly, explanation of compositions similar to the first embodiment is appropriately omitted below.

Figure 10:
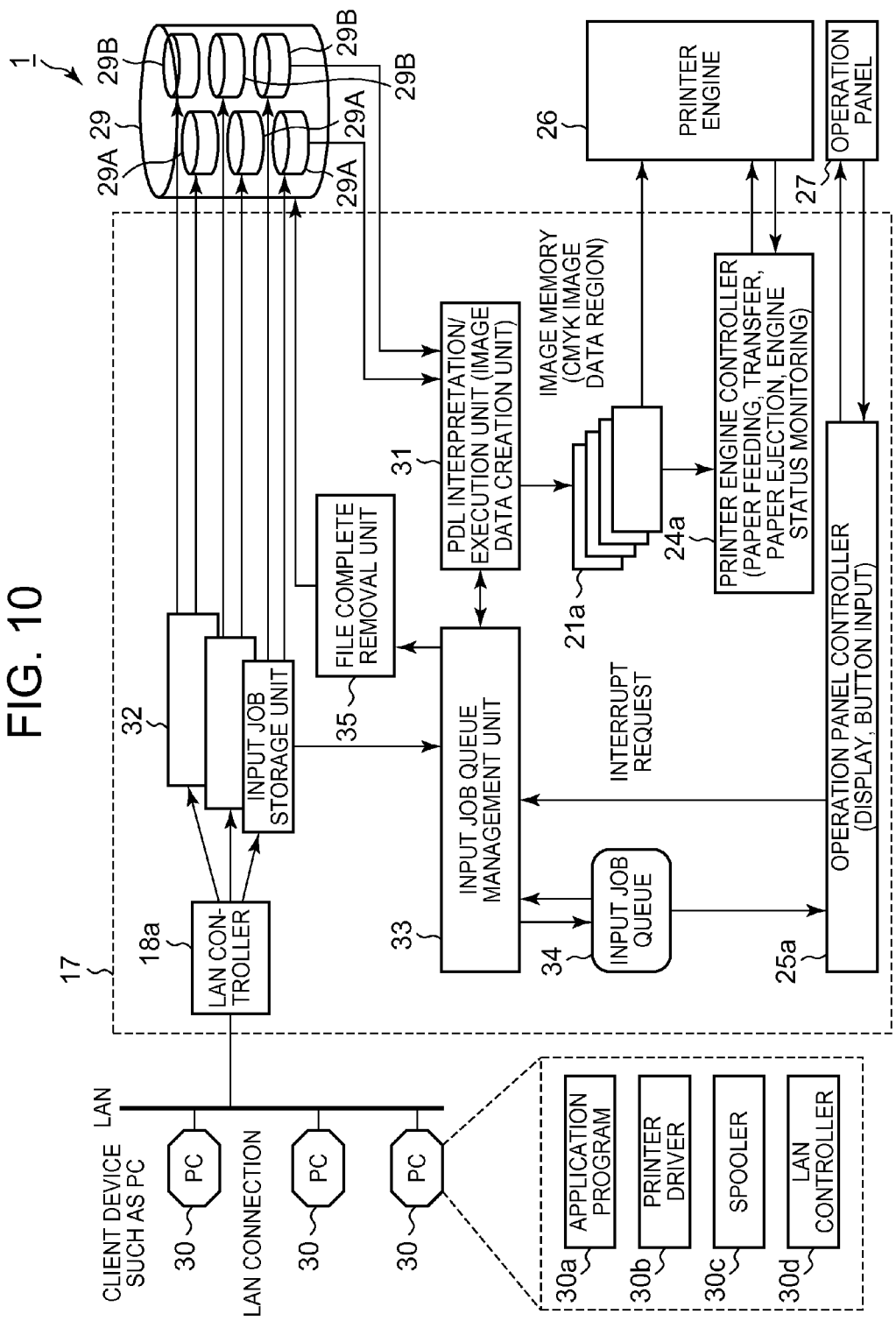
FIG. 10 shows the software composition for a printing control unit provided in a printing device according to a second embodiment.

FIG. 10 shows the software composition of the above-described printing control unit 17, and functional units based on the circuits shown in above-described FIG. 3 are described using related numbers. The printing device 1 (printing control unit 17) of the present embodiment is connected to a client device (host equipment) 30 such as a personal computer (PC) or the like via a LAN (Local Area Network). The client device 30 includes for example an application program 30a, a printer driver 30b, a spooler 30c and a LAN control unit 30d.

The client device 30 converts print data created in accordance with the application program 30a into intermediate data including the above-described PDL command through the printer driver 30b, retains this in the spooler 30c and supplies this to the printing device 1 via the LAN control unit 30d.

The print data supplied from the client device 30 is supplied to the printing device 1 via the above-described LAN control circuit 18 (LAN control unit 18a).

As noted above, the printing device 1 is equipped with an engine control unit 24a corresponding to the engine control circuit 24, an operation panel control unit 25a corresponding to the operation panel control circuit 25 and an image memory 21a corresponding to the memory 21. The printing device 1 is further equipped with a PDL interpretation/execution unit 31 that controls the CPU 20 through a program stored in the ROM 23 and interprets and executes print data; an input job storage unit 32 that executes an input job storage process; an input job queue management unit 33 that accomplishes input job queue management; and a file complete removal unit 35 that removes a file by overwritten all file data with certain pattern data.

In addition, the engine control unit 24a corresponding to the above-described engine control circuit 24 sets the printer engine operation mode and the like for the printer engine 26 and executes control of a paper supply process, a transfer process for image data from the image memory 21a and a paper discharge process. In addition, the engine control unit 24a monitors the engine status intermittently for a set interval, acquires from each paper feed section the status of the paper feed section and monitors the status of each paper feed section. Information that can be obtained from the paper feed sections is information indicating for example whether or not a cassette is installed, the set condition or withdrawn condition of the cassette, the presence or absence of paper, or paper size.

In addition, an input job queue 34 is composed on the above-described nonvolatile memory 22 or the hard disk 29. The composition of the USB control circuit 19 shown in FIG. 3 is not particularly shown in FIG. 10.

FIG. 11 shows the data format of print data (print job) created by the printer driver 30 and supplied to the printing device 1. The print data first includes an identifying flag and (&) length description D1 in which the identifying flag and length are described, a data description area D2, an identifying flag and length description D3, a data description area D4, an identifying flag and length description D5, a data description area D6, an identifying flag and length description D7, . . . , and an identifying flag and length description D99.

Here, the identifying flags described in the identifying flag and length descriptions D1, D3, D5, D7 and so forth are such that for example "0" indicates a PDL command other than an image drawing command is described in the next area, "1" indicates that an image drawing command (PDL command) is described in the next area, and "2" indicates that information on user name and print job name is described in the next area. In addition, length indicates the length of information described in the next area (D2, D4, D6 and so forth). The identifying flag "9" recorded in D99 expresses the end of the print job and in this case the length is 0.

For example, in the example shown in FIG. 11, the identifying flag in the first identifying flag and length description D1 is "2", so the user name and print job name are described in the next data description area D2, and the identifying flag in the next identifying flag and length description D3 is "0", so a PDL command other than an image drawing command is described in the next data description area D4. This PDL command is a PDL command for example for information on paper size, information on state of paper feed section or information on resolution and gradation settings.

In addition, the identifying flag in the next identifying flag and length description D5 is "1", so an image drawing command is described in the next data description area D6. This image drawing command is composed of an image data part and a control command part instructing to draw image data as-is on the printing device side, including data already developed into image data that should be printed on the client device side.

Furthermore, lastly, the identifying flag in the identifying flag and length description D99 is "9", expressing the end of the print job.

In the above composition, the process action of this example is as described below.

Figure 12B:
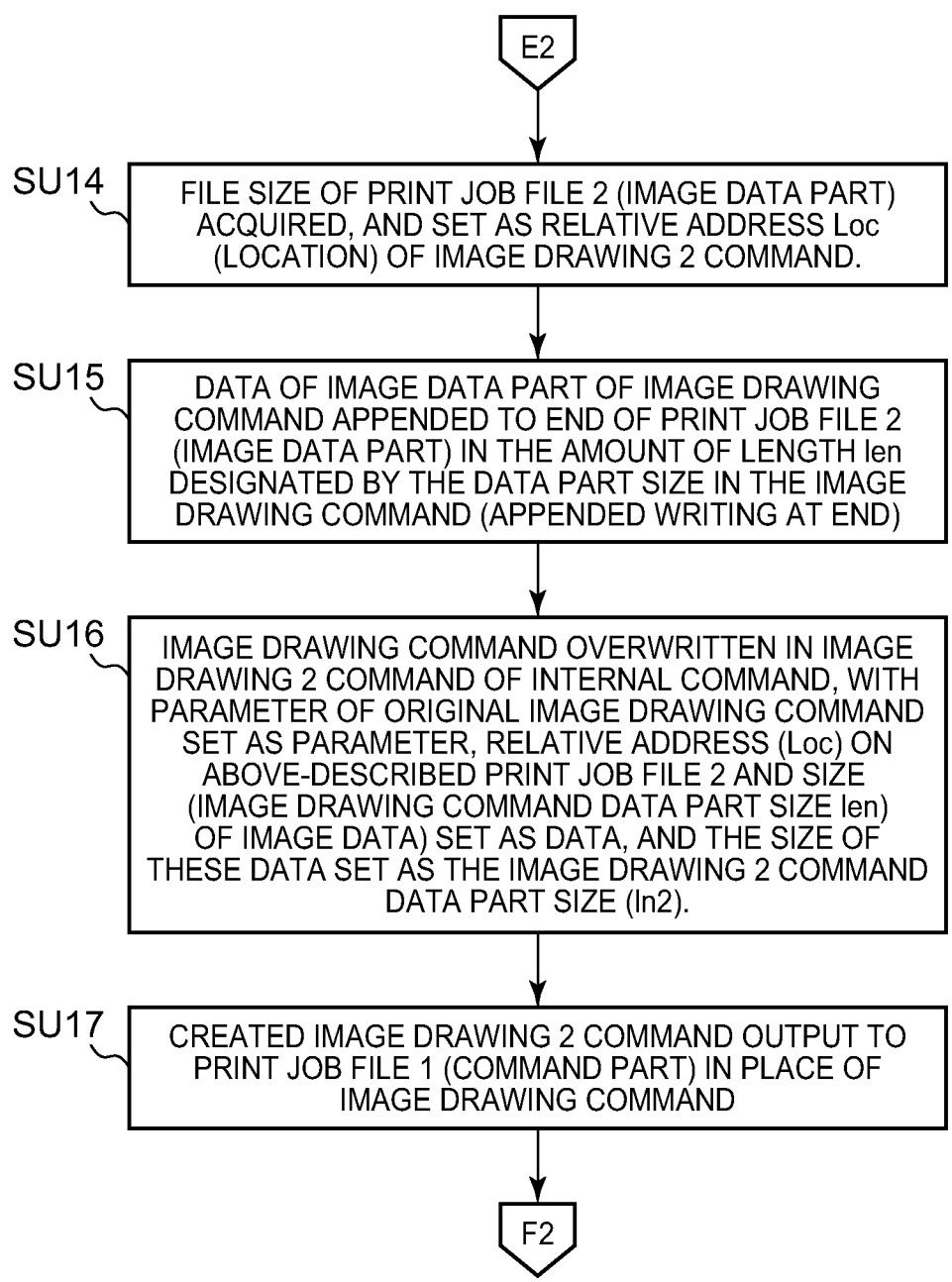
FIG. 12B is a flowchart showing processes executed by the input job storage unit.

First, FIGS. 12A and 12B are flowcharts explaining the processes the LAN control unit 18a and the input job storage unit 32 execute, and explain processes executed when print data having the above-described format is input. First, the LAN control unit 18a, upon receiving the print data (step (hereafter indicated by "SU") 1), buffers the print data in a receiving buffer (SU2). The receiving buffer is set for example in a designated area of the above-described memory 21.

Next, the LAN control unit 18a notifies the input job storage unit 32 of print data input and wakes up the input job storage unit 32 (SU3).

On the other hand, the input job storage unit 32, waiting to receive print data, through notification from the LAN control unit 18a as noted above begins a process and retrieves the print data stored in the receiving buffer (SU4, SU5). Through this process, print data in the above-described format is retrieved by the input job storage unit 32 and an identifying flag and length description analysis process is executed.

Figure 13:
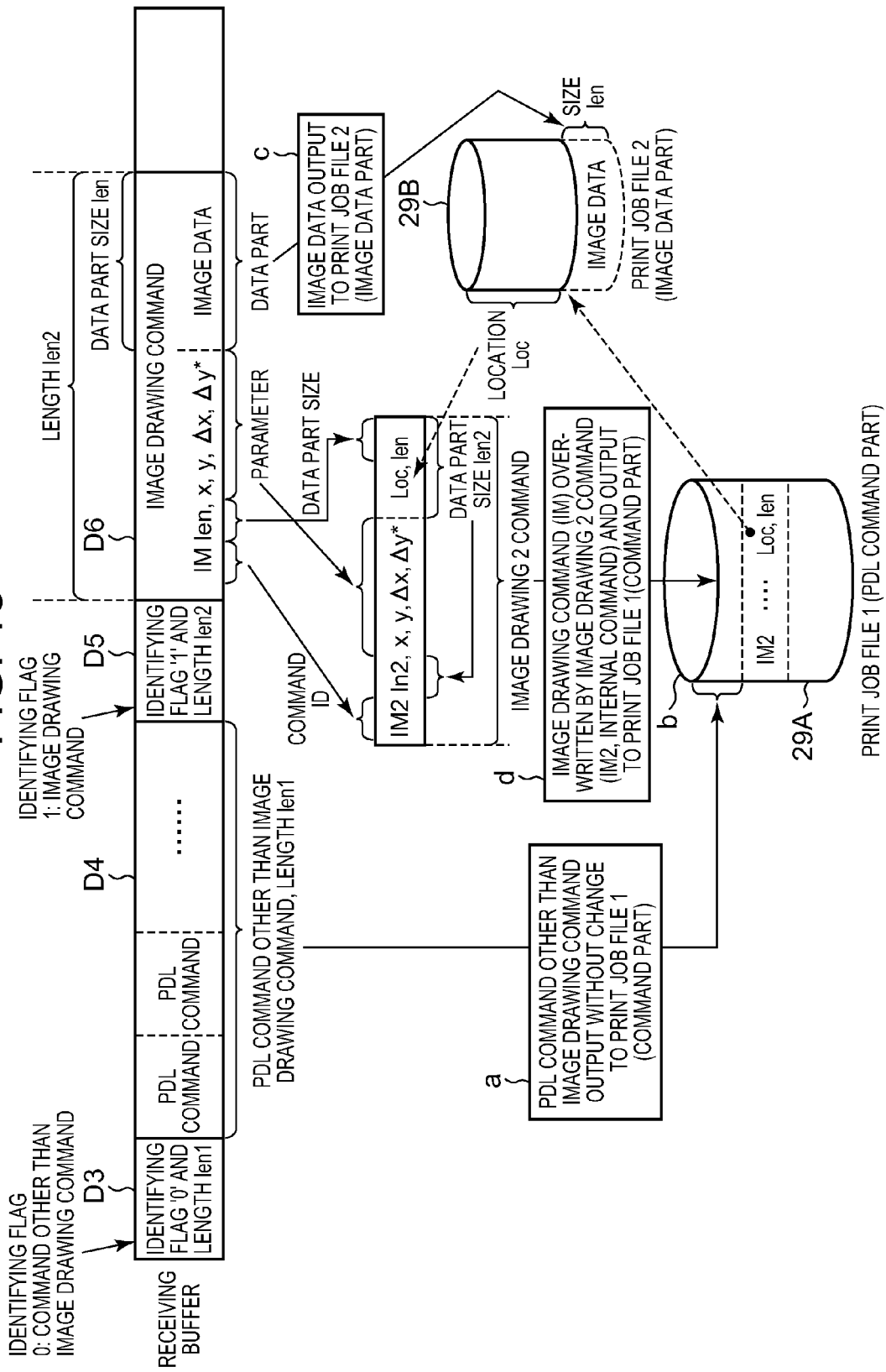
FIG. 13 shows in detail a process relating to the identifying flag and length description unit.

FIG. 13 explains in detail processes for the identifying flag and length descriptions D3 and D5 and the data description areas D4 and D6.

First, the input job storage unit 32 retrieves the identifying flag and length information included in the first identifying flag and length description D1 of the print data (SU6). In the example shown in FIG. 11, the identifying flag is "2" and the length is "len0". In this case, the determination is "yes" (SU7: Yes), and the input job storage unit 32 saves the user name and print job name information described in the data description area D2 following the identifying flag and length description D1 (SU8). Furthermore, the input job storage unit 32 automatically creates and saves the print job file 1 and 2 names (SU9). These print job file 1 and 2 names are unique names.

On the other hand, when the identifying flag is not "2" in the above determination (SU7), the input job storage unit 32 determines whether the identifying flag is "9" (SU10). When the identifying flag is "9", in other words when the print job is finished, the input job storage unit 32 outputs a job registration request to the input job queue management unit 33 (SU11). The input job storage unit 32 at this time transfers to the input job queue management unit 33 the saved user name, print job name and job file 2 name.

When the identifying flag is not "9" in the above determination (SU10), the input job storage unit 32 determines further whether the identifying flag is "0" (SU12). In the example shown in FIG. 13, "0" is set as the identifying flag in the next identifying flag and length description D3 (SU7: No; SU10: no; SU12: Yes), so a PDL command other than an image drawing command is retrieved from the data description area D4 following the identifying flag and length description D3. That is to say, the length "len1" of PDL command is retrieved and this PDL command is written in print job file 1 (SU13).

This process is the process "a" shown in FIG. 13. In addition, the above-described print job file 1 is a file built on the above-described hard disk 29, and is a file that stores the above-described PDL command and a below-described image drawing 2 command (internal command).

Accordingly, the PDL command is first written in a prescribed area of the print job file 1 by the above process ("b" shown in FIG. 13).

In the drawing, the region on the hard disk 29 where the print job file 1 is stored is a memory region 29A, and the region on the hard disk 29 where the print job file 2 is stored is a memory region 29B. In other words, the hard disk 29 includes the memory region 29A and the memory region 29B. The memory region 29A and the memory region 29B may also be provided on separate hard disks.

Next, the input job storage unit 32 retrieves the information of the identifying flag and length description D5 and determines the identifying flag. In the example shown in FIG. 13, this identifying flag is "1", so the image drawing command of the data description area D6 following the identifying flag and length description D5 is retrieved (SU12: No).

Here, the format of the image drawing command and the image drawing 2 command is composed of a command ID, data size, parameters, a partition code and data, and the image drawing command is composed of:

command ID: a command identifier (IM) indicating the image drawing command;

data size: the size (len) of the data part of the main command;

parameters: the parameters of the main command (x, y, $\Delta x$, $\Delta y$);

partition code: a code that partitions the parameters and data portion (*); and data: the image data itself (size is indicated by the data size len).

In this case, the input job storage unit 32 appends the image data part of the image drawing command to the end of the print job file 2, overwrites the command parameter part with the image drawing 2 command and writes to the print job file 1.

The image drawing 2 command is a structure comprising:
command ID: a command identifier (IM2) indicating the image drawing 2 command;
data size: the size (ln2) of the data part of the main command;
parameters: the same as the parameters of the image drawing command (x, y, $\Delta$x, $\Delta$y);
partition code: a code that partitions the parameters and data portion (*); and
data: relative address (Loc) and image data size (len) on the print job file 2 indicating the image data itself (the size combining Loc and len is the data size ln2).

The input job storage unit 32 first acquires the file size of the print job file 2 and sets the relative address Loc (location) of the image drawing 2 command (SU14).

This print job file 2 is also a file built on the hard disk 29, and is a file that stores the image data part of the image drawing command. That is to say, because the image data is appended to the end of the print job file 2, the file size prior to the appending is the relative address Loc on the print job file 2 of this image data.

Next, the input job storage unit 32 stores at the end of the print job file 2 the image data part of the image drawing command, to a length designated by the data part size of the image drawing command (SU15). That is to say, the input job storage unit 32 appends image data (size len) from the position of the relative address Loc of the print job file 2, as shown in part c of FIG. 13.

Next, the input job storage unit 32 converts the image drawing command into an image drawing 2 command that is an internal command. That is to say, the input job storage unit 32 changes the command ID into the image drawing 2 (IM2) from the image drawing (IM), the parameters of the image drawing 2 are left as the original parameters, and the data portion of the image drawing 2 is made the relative address Loc and the image data size len when the image data is appended to the print job file 2 (the size of the data portion is the size ln2 of the data portion of the new image drawing 2) (SU16). That is to say, the input job storage unit 32, as shown by "d" in FIG. 13, stores "IM2 ln2 x, y, $\Delta$x, $\Delta$y*", which are the parameters of the original image drawing command, along with the len, which is the image data size, and the relative address Loc as data of the image drawing 2 command.

Next, the input job storage unit 32 outputs the created image drawing 2 command to the print job file 1 in place of the image drawing command (SU17).

Next, the input job storage unit 32 determines whether all print data retrieved from the receiving buffer has been processed (SU18) and repeats the above processes until all retrieved print data is processed (SU18: No; SU6-SU17). Furthermore, when all processes have been completed (S18: Yes), receipt of the print data is awaited (SU4).

Figure 14A:
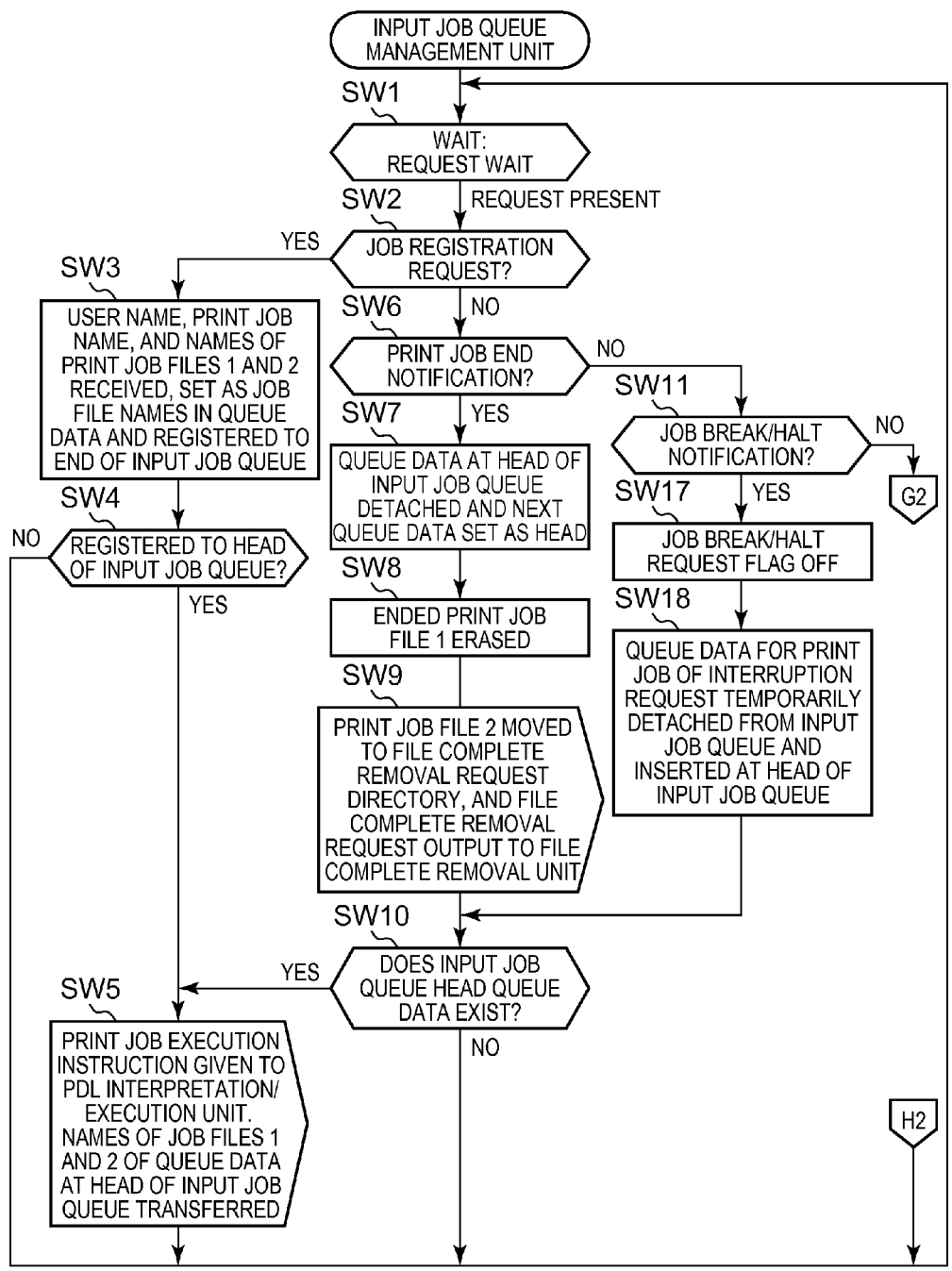
FIGS. 14A and 14B are flowcharts showing a process executed by the input job queue management unit.
Figure 14B:
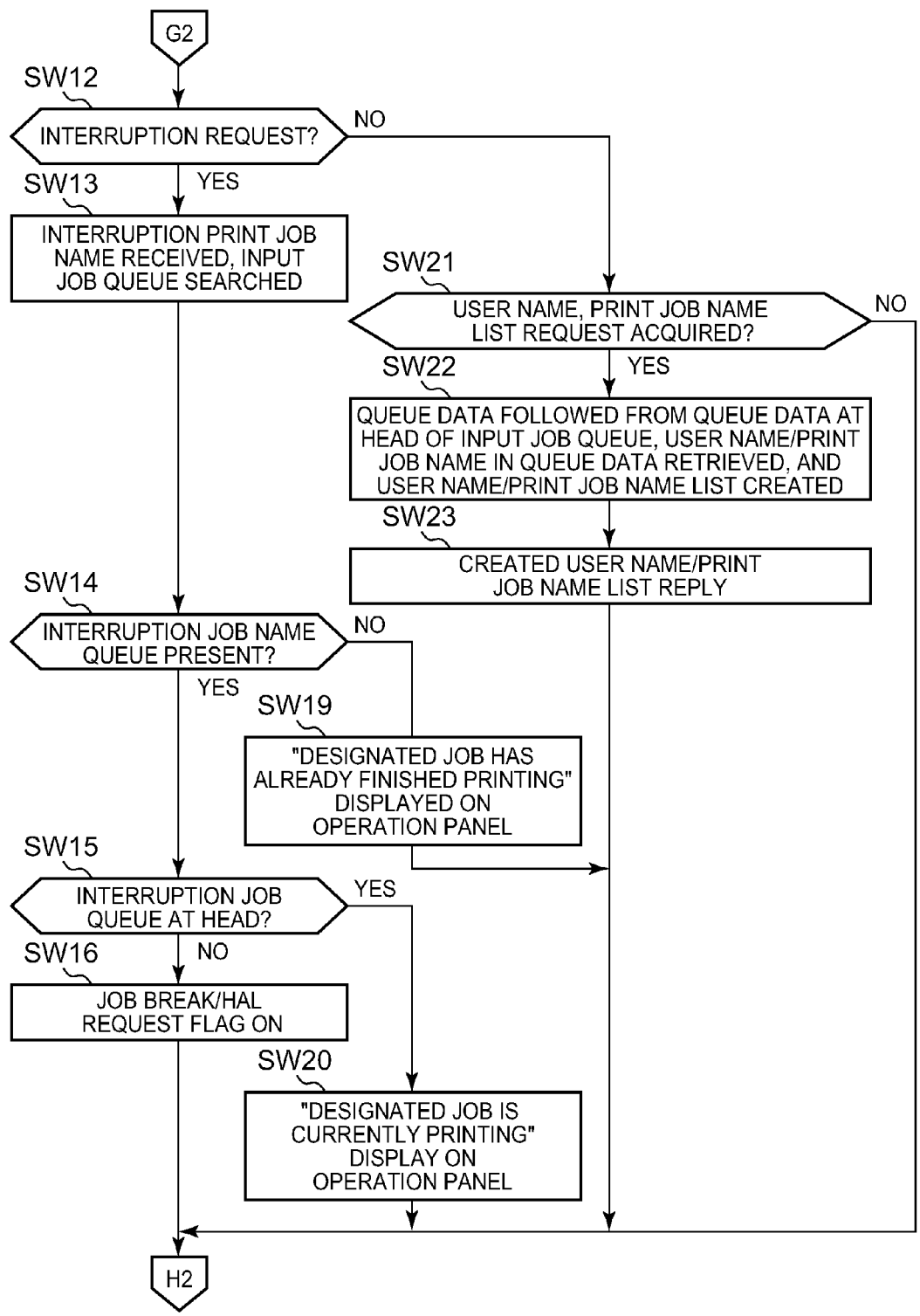

Next, the actions of the input job queue management unit will be explained with reference to FIGS. 14A and 14B.

The input job queue management unit 33 waits in a request wait state (step (hereafter indicated by "SW") 1), and when a registration request is output from the above-described input job storage unit 32, first determines whether the request is a job registration request (SW2). Here, when it is determined that there is a job registration request from the input job storage unit 32 (SW2: Yes), the input job queue management unit 33 receives the information of the above-described user name, print job name and print job file 1 and 2 names, creates new queue data, sets the information on the received print job name in the queue data and registers that queue data to the end of the input job queue (SW3).

Figure 15:
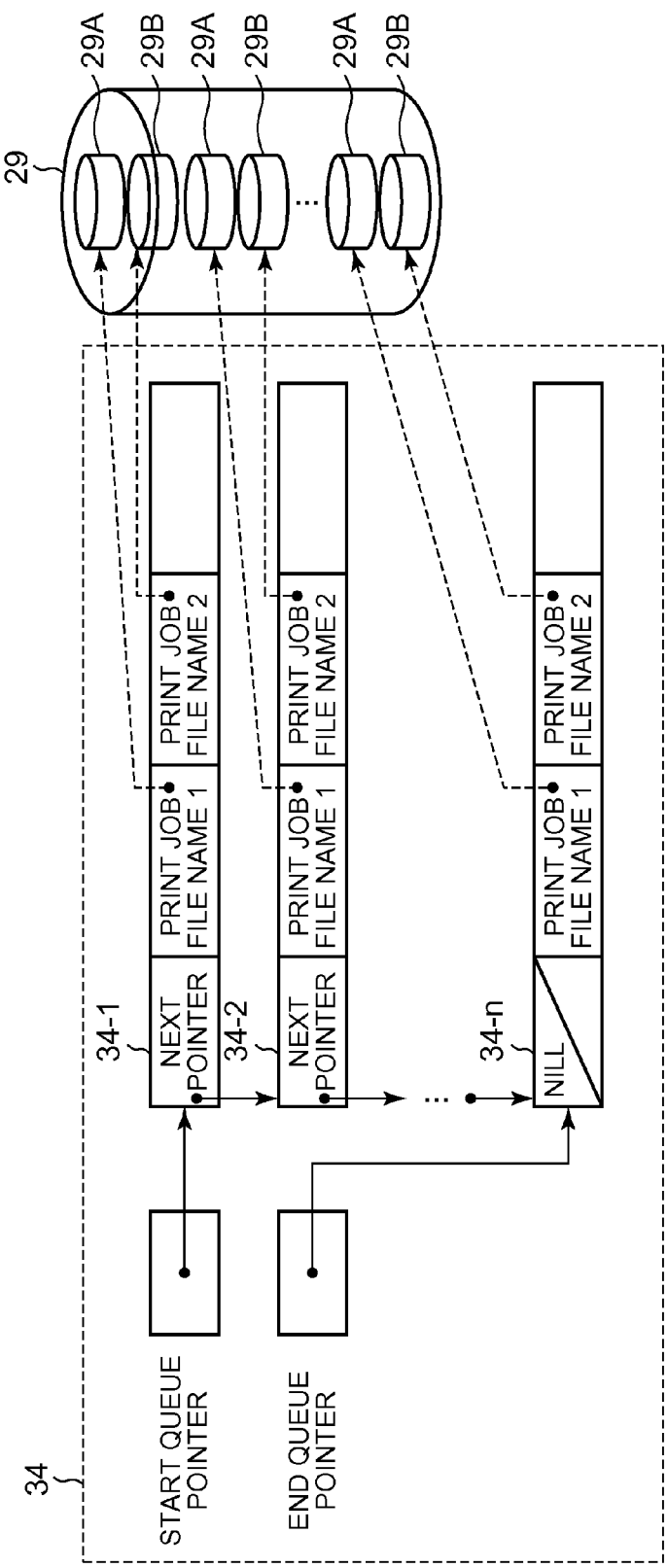
FIG. 15 shows the data composition of the input job queue.

FIG. 15 shows the composition of data in the input job queue 34. The start queue pointer links to the first print job information 34-1. That is to say, the start queue pointer indicates the address at the head of the first print job information 34-1. The next pointer of the first print job information 34-1 indicates the next print job information 34-2, and the next print job information 34-n is indicated in accordance with the designation of successive next pointers after that. That is to say, the next pointer of the print job information 34-i (here, i is an integer satisfying 1$\leq$i<n) indicates the address at the head of print job information 34-(i+1). In each print job information 34-1 to 34-n, the above-described user name, print job name, print job file 1 and 2 names are recorded.

Next, the input job queue management unit 33 determines whether the above-described print job file has been registered to the head of the input job queue 34 (SW4). In other words, the input job queue management unit 33 determines whether a job has been introduced in a non-printing status. When this has been registered to the head of the input job queue 34 (SW4: Yes), the input job queue management unit 33 instructs the PDL interpretation/execution unit 31 to execute the print job (SW5). At this time, the input job queue management unit 33 transfers information about the print job files 1 and 2 names to the PDL interpretation/execution unit 31.

Figure 16B:
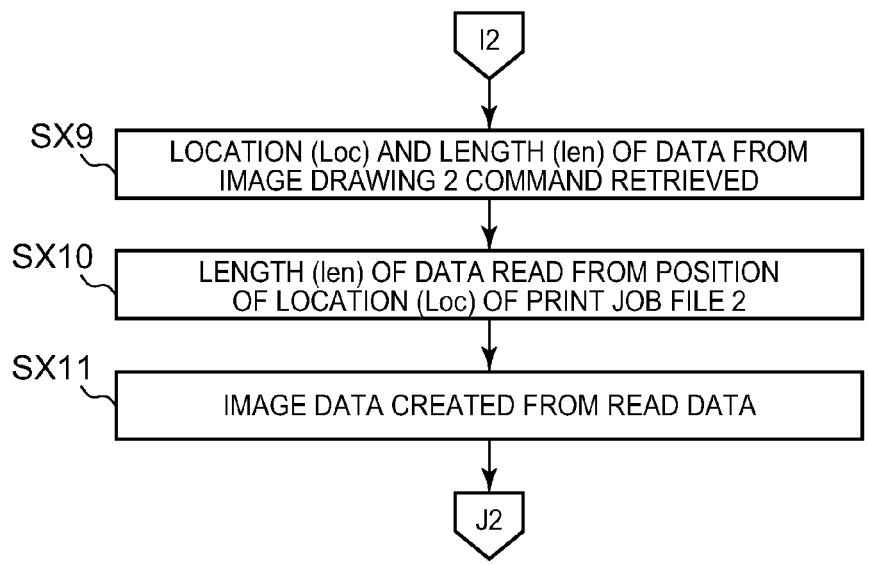
Figure 16C:
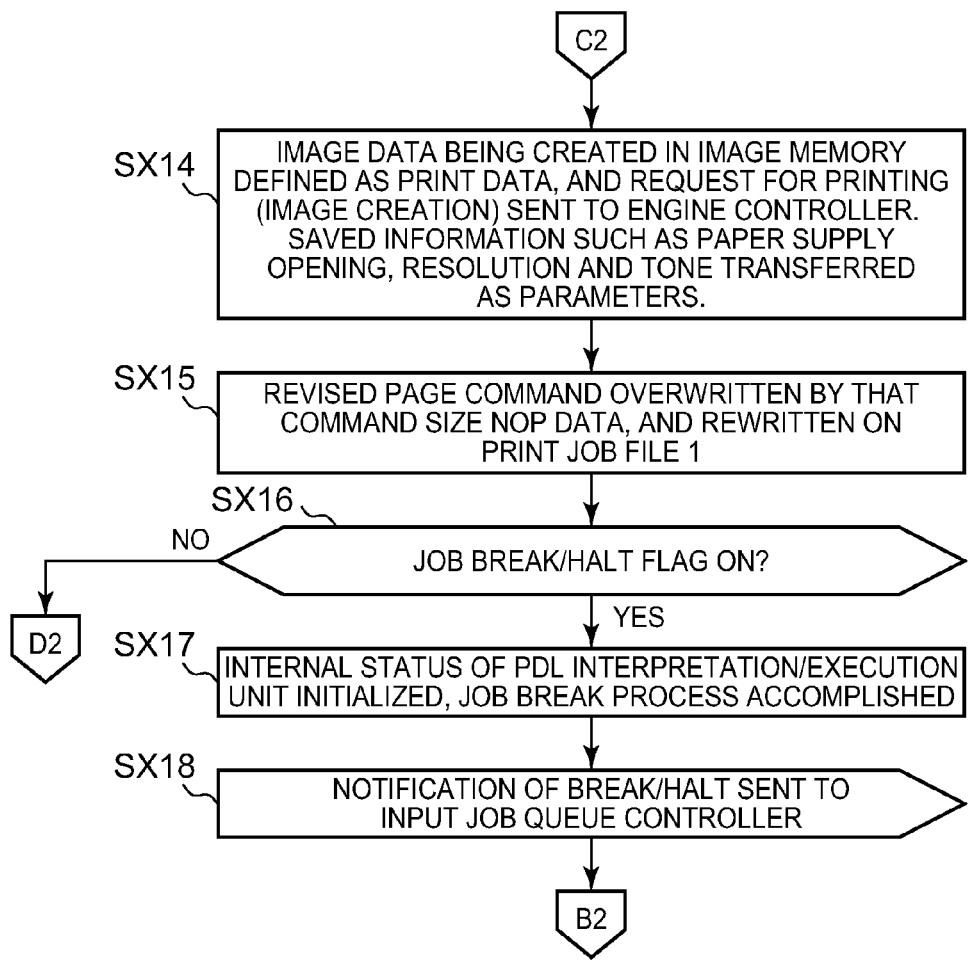

FIGS. 16A, 16B and 16C are flowcharts explaining the process executed by the PDL interpretation/execution unit 31. Waiting in a request wait state (step (hereafter indicated by "SX") 1), when an instruction of execute a print job is received by the PDL interpretation/execution unit 31 (SX2), the PDL interpretation/execution unit 31 receives information about the print job file 1 and 2 names transferred from the input job queue management unit 33 (SX3).

Next, the PDL interpretation/execution unit 31 first retrieves information on the print job file 1 (SX4). The PDL interpretation/execution unit 31 determines whether there is retrieved data present (SX5). When there is retrieved data in the print job file 1 (SX5: Yes), the PDL interpretation/execution unit 31 accomplishes analysis of the PDL command stored in the print job file 1 (SX6).

First, the PDL interpretation/execution unit 31 accomplishes the command process without change for PDL commands that do not create image data, for example PDL commands such as information on the state of paper feed section and information on the resolution and gradation necessary when accomplishing the print process (SX7). In addition, the PDL interpretation/execution unit 31 accomplishes the command process without change for PDL commands that create image data also (SX8).

The PDL interpretation/execution unit 31 retrieves information on the relative address Loc and the length len of the image drawing 2 command for the image drawing 2 command that is an internal command overwritten in the input job storage unit (SX9), and retrieves data to the above-described length len from the position of the relative address Loc of the print job file 2 (SX10). This data is the image data portion stored in the print job file 2 of the hard disk 29 by the above-described process, and the information of this image data portion is retrieved and image data is created based on the retrieved image data (SX11).

Figure 17:
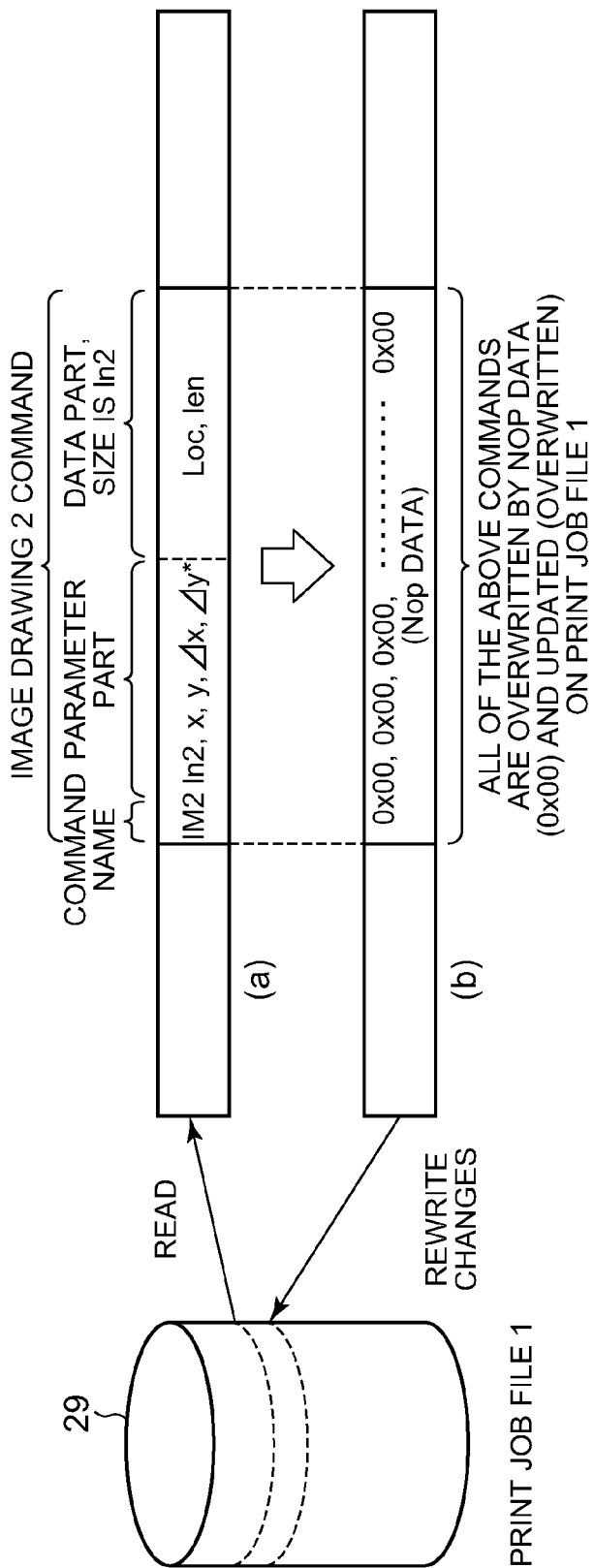
FIG. 17 shows one portion of the data format of print data and a portion of the data format of print data replaced by an NOP command.

FIG. 17 is a drawing showing one part of the data format of the print data, and is a drawing showing the composition of a command for creating image data. Part a in FIG. 17 shows one portion of the data format of the print data. As an example, the image drawing 2 command of the above-described internal command can be cited. PDL commands that create image data include image drawing 2 commands that are internal commands, and also text drawing commands, graphic drawing commands for lines or circles and PDL commands designating coordinates for drawing. The PDL interpretation/execution unit 31 accomplishes the command process without change for these PDL commands that create image data.

When the respective processes for PDL commands that create image data end, the PDL interpretation/execution unit 31 next overwrites the above-described PDL command with that size of NOP data (one byte of data, the value being 0x00), and writes this to the same print job file 1 on the hard disk 29 (SX12).

If all of the retrieved data has not been interpreted (SX13: No), the PDL interpretation/execution unit 31 continues to execute PDL command analysis (SX6). In the case of an update page command, the PDL interpretation/execution unit 31 defines the image data being created as print data in the image memory 21a, instructs the engine control unit 24a to conduct a print process and at the same time transfers as parameters information on the state of paper feed section, and information on the resolution and gradation (SX14). In addition, the PDL interpretation/execution unit 31 overwrites the update page command with NOP data also, and writes this to the same print job file 1 on the hard disk 29 (SX15).

Next, the PDL interpretation/execution unit 31 determines whether or not the job interruption/halt flag is on (SX16), and if the job interruption/halt flag is not on (SX16: No), determines that not all retrieved data has been interpreted and repeats the above-described processes (SX13: No; SX6-SX13).

Following this, when the PDL interpretation/execution unit 31 has interpreted all of the retrieved data (SX13: Yes, SX5: No), notification of the end of the print job is set to the input job queue management unit 33 (SX20). Upon receiving notification of the end of the print job from the PDL interpretation/execution unit 31 (SW6: Yes), the input job queue management unit 33 detaches the head queue data of the input job queue 34 and makes the next queue data the head (SW7). Furthermore, the input job queue management unit 33 deletes the print job file of the completed print job, moves the print job file 2 to a file complete removal request directory and outputs a file complete removal request to the file complete removal (elimination) unit 35 (SW8, WS9).

Figure 18:
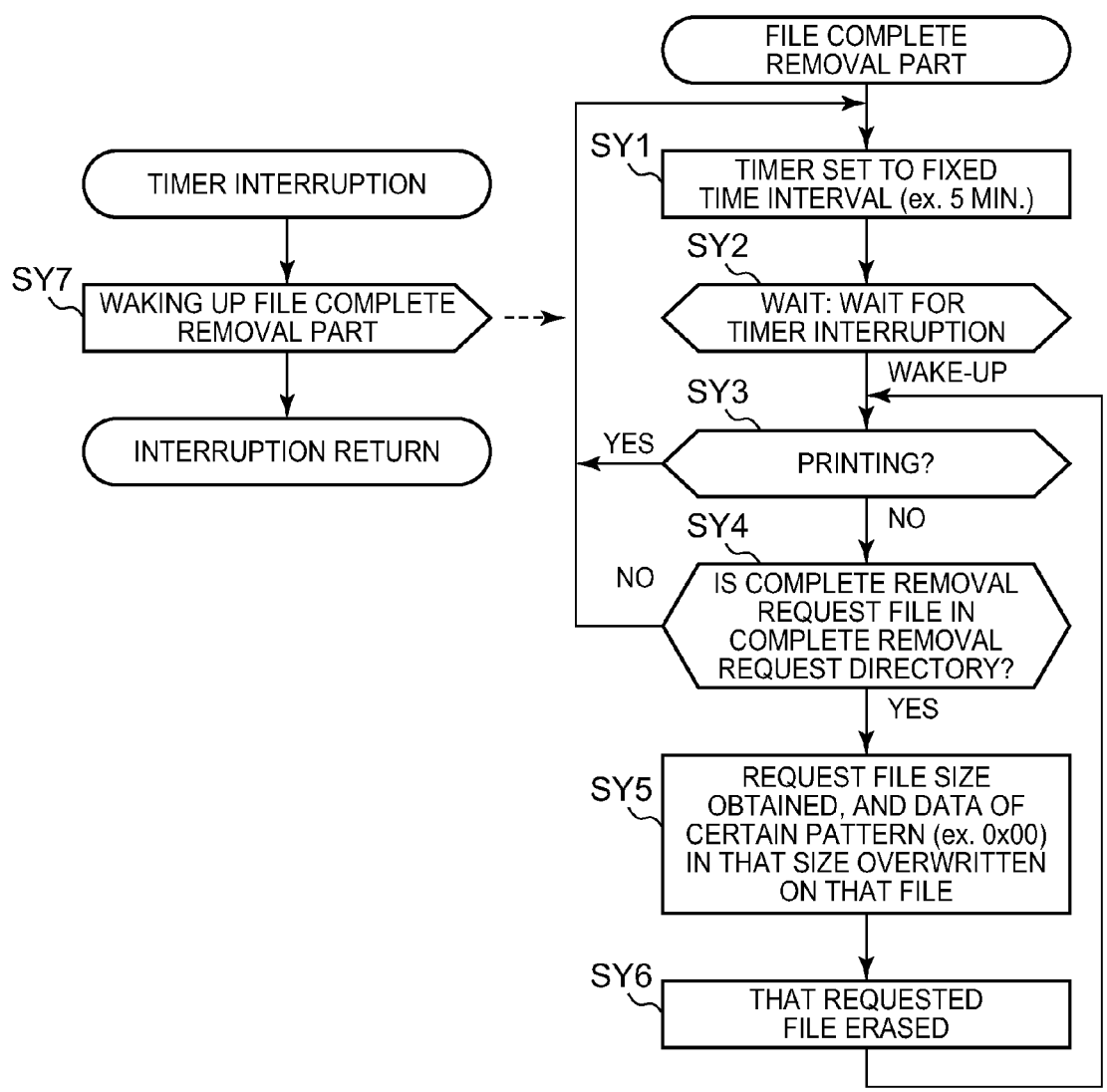
FIG. 18 is a flowchart showing a process executed by a file complete removal unit.

As shown in FIG. 18, the file complete removal unit 35 is activated at a set time interval or when a file complete removal request is output from the input job queue management unit 33 (SY1, SY2), determines whether printing is currently underway (SY3) and if printing is not currently underway (SY3: No), checks whether there is a complete removal request file in the complete removal request directory (SY4). When there is (SY4: Yes), the file complete removal unit 35 acquires the size of that requested file, overwrites that size of the file with data of a certain pattern (ex., 0x00) and following this deletes the file (SY5, SY6). In other words, when the printing device is not printing, file removal is accomplished by completely deleting file data.

Furthermore, the input job queue management unit 33 determines whether there is head queue data in the input job queue 34 (SW10), and when there is queue data at the head of the input job queue 34 (SW10: Yes), the input job queue management unit 33 instructs the PDL interpretation/execution unit 31 to execute a print job (SW5) and the print process by the above-described PDL interpretation/execution unit 31 is repeated.

On the other hand, during the above-described print process, print job information recorded in the above-described input job queue 34 is displayed on the operation panel 27 under control by the operation panel control unit 25a. FIG. 9 shows an example of the print job information recorded in the input job queue 34 displayed on the operation panel 27. As shown in this figure, the print job name and user name of the job being printed and the print job name and user name of the job in print execution standby are displayed on the operation panel 27. In addition, in the case of states in which interruption printing is possible, an "interruption printing" mark 27c indicating the possibility of interruption printing is displayed on the operation panel 27.

In the above-described display, the operation panel control unit 25a outputs a user name and print job name list acquisition request to the input job queue management unit 33 and displays the user name and print job name on the operation panel 27 based on the acquired list.

When there is a user name and print job name list acquisition request (SW121: Yes), the input job queue management unit 33 follows the queue data from the head queue data of the input job queue 34, retrieves the user name and print job name in the input job queue 34 and creates a list (SW22). Furthermore, the input job queue management unit 33 accomplishes a response to the above-described list (SW23).

When an interruption key 27d (substituted by the right arrow key (>) shown in FIG. 4) is pressed in the display state shown in the above-described FIG. 9, the display of the print job name and user name on print standby is reversed, as shown in this figure, and it is possible to select the print job to accomplish interruption printing by the up and down arrow keys (∧, ∨) shown in the above-described FIG. 4 being pressed. In addition, determination of the selected print job can be made by the decision key in the key unit 27b shown in the above-described FIG. 4 being pressed.

When interruption printing is indicated by the above-described operation, an operation signal is supplied as an interruption request from the operation panel 27 to the interruption control unit 33 under the control of the operation panel control unit 25a. When the above-described interruption request is sent (SW1 is "request present"; SW2: No; SW6: No; SW11: No; SW12: Yes), the input job queue management unit 33 receives the print job name information for which the interruption process will be executed and searches the input job queue 34 (SW13).

Furthermore, the input job queue management unit 33 determines whether a print job name for which interruption printing was designated exists in the input job queue 34, and when such does not exist (SW14: No), "designated job has already finished printing" is displayed on the operation panel (SW19). When queue data with the print job name on which an interruption instruction was accomplished exists (SW14: Yes), the input job queue management unit 33 determines whether the queue of this print job name is the head queue data (SW15). When the queue data of this print job name is the head (SW15: Yes), the input job queue management unit 33 displays "designated job is currently printing" on the operation panel because this job is currently printing, and because there is no particular need to accomplish an interruption process, the current printing continues without change (SW20).

When it is determined that the queue data of this print job name is not at the head (SW15: No), the input job queue management unit 33 turns the job interruption/halt request flag on (SW16) and waits for interruption of the job (SW1).

When the job interruption/halt request flag has been turned on, the PDL interpretation/execution unit 31, which is engaged in a print process, initializes the internal state of the PDL interpretation/execution unit 31 because in the above-described determination (SX16), the job interruption/halt request flag is on (SX16: Yes), and interrupts the process of the print job being executed (SX17). In addition, the PDL interpretation/execution unit 31 notifies the input job queue management unit 33 that the continuing print job process has been interrupted (SX18).

When this job interruption/halt notification is given (SW11: Yes), the input job queue management unit 33 turns the job interruption/halt request flag off (SW17), temporarily removes the queue data of the print job of the interruption request from the input job queue 34, and inserts such at the head of the input job queue 34 (SW18).

Following this, the input job queue management unit 33 determines that queue data is at the head of the input job queue 34 (SW10: Yes), and the input job queue management unit 33 instructs the PDL interpretation/execution unit 31 to execute the print job, the same as above (SW5), and the print process is accomplished by the above-described PDL interpretation/execution unit 31. The print process of this interruption printing is the same as described above and is executed by the PDL interpretation/execution unit 31.

Next, when the above-described interruption printing has concluded (SX13: Yes; SX20, SW6: Yes), the input job queue management unit 33 removes the queue data for which interruption printing was accomplished at the head of the input job queue 34 and moves the next queue data to the head (SW7). Furthermore, the input job queue management unit 33 deletes the print job file 1 of the concluded print job, moves the print job file 2 to the file complete removal request directory and outputs a file complete removal request to the file complete removal unit (SW8, SW9). Furthermore, the input job queue management unit 33 determines whether there is head queue data in the input job queue 34 (SW10), and the information of the print job file interrupted this time is recorded at the head of the input job queue 34 and the below process is accomplished.

That is to say, the PDL interpretation/execution unit 31 first retrieves the information of the print job file 1 from the file head of the same as above, accomplishes analysis of the PDL command stored in the job file 1 and accomplishes a reinstatement print process. In this case, PDL commands such as information of state of paper feed section, resolution and gradation information and like necessary when accomplishing the print process are included in the print job file 1 the same as described above, and the PDL interpretation/execution unit 31 accomplishes command processing without change for this PDL command (SX7).

On the other hand, NOP data shown in part b of FIG. 8 is skipped over (SX19). Accordingly, the command to create image data accomplished by the print process in the subsequent print processes and page update commands are overwritten by the NOP command and skipped over.

That is to say, for pages printing of which was already output in the reinstatement/restart process for the print job temporarily interrupted, NOP data is overwritten by the above-described process, it is possible to skip over NOP data and moreover, absolutely no access is needed to the print job file 2 in which image data with large capacity is recorded. For pages whose printing has not yet been output in the previous printing process, the NOP command overwrite process is not conducted, and instead the above-described processes (SX8, SX9, SX14) are accomplished.

As described above, with the present embodiment it is possible to accomplish a job reinstatement/restart process after an interruption printing process efficiently and in a short time. Accordingly, it is possible to speed up the print job reinstatement process and markedly improve interruption reinstatement performance.

In addition, PDL commands for creating image data are replaced by NOP data whose value is 0x00, and this is written to the print job file 1, and when printing has ended, PDL commands for creating image data are completely gone in the print job file 1 on the hard disk, all having been replaced by NOP data (whose value is 0x00). Furthermore, the file is deleted in this state. In other words, information relating to content of printed material other than image data has completely disappeared and in this state the file is deleted. In addition, for the print job file 2, all data is overwritten with the value 0x00 when printing is not being conducted and then the file is deleted, so the contents of the image data also are erased and the contents of the printed material completely disappears with no trace. Consequently, even if the hard disk is stolen and the print job file that was deleted is restored by some kind of method by a user with evil intent, information relating to the contents of the printed material is completely gone, so there are absolutely no worries about information leaks.

In addition, considerable time is not taken even in overwriting the small-volume print job file 1 with NOP data, so there is virtually no effect on performance, and because the large-volume print job file 2 is completely removed when print processes are not being conducted, there is virtually no performance-related effect on the print process. In this manner, in addition to speeding up the above-described print job reinstatement process and improving interruption reinstatement performance, there are benefits in terms of security as well.

(Variations)

Above, a number of embodiments of the present invention were described, but the scope of the present invention is not limited to these embodiments. That is to say, embodiments in which one skilled in the art has replaced various elements in these embodiments with equivalent ones are also included in the scope of the present invention.

In the above-described embodiments, a print job was specified by operating the operation panel 27 and accomplishing an interruption process, but the received print job itself may be given priority. For example, it would be fine to designate a priority such as emergency or normal or to accomplish specification of priority order and to accomplish a process similar to that described above.

In this case, a description related to the priority level is made at the head of the print job so the priority level can be recognized, and in the input job storage unit 32, after this priority level is recognized and the print job is stored, an interruption printing request is output for print jobs having high priority levels. When there is an interruption printing request, interruption/halting of the print job currently being interpreted and printed is accomplished, the print job of the recording request for interruption printing is inserted at the head of the input job queue and control is performed so that this print job is interpreted and executed. In addition, in the explanation of the above-described embodiments, an example of a color printer as the printing device was explained, but the present invention can be similarly implemented even for a multi-function printer, for example an MFP or the like.

Naturally, the present invention can be realized by a printing device provided with functions and composition similar to the printing device of the above-described embodiments, and by applying a program to an existing printing device, it is possible to cause this to function as a printing device according to the present invention. In this case, it is possible to cause this to function as a printing device according to the present invention by causing a program for realizing the same functions as the above-described printing device to be executed on the computer (CPU or other control unit) of a printing device provided with the same composition as the printing device illustrated in the above-described embodiments. The method of applying such a program is arbitrary, and for example this program can be applied by storing such on a memory medium such as a CD-ROM, memory card or the like, or can be applied via a communications medium such as the Internet or the like.

Having described and illustrated the principles of this application by reference to one (or more) preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A printing device that executes a print job based on print data supplied from electronic equipment connected via a network, and permits interruption by another print job during execution of the supplied print job, the printing device comprising:
    a receiver which receives the print data which includes a series of PDL commands from the electronic equipment;
    a PDL command registration unit which registers the series of PDL commands included in the received print data into a PDL command memory unit;
    a print job control unit which, when the print data is received, registers print job specifying information that specifies the print job represented by the received print data to the end of an input job queue; and
    a command execution unit which executes the print job by successively executing the series of PDL commands stored in the PDL command memory unit from the head;
    wherein each of the series of PDL commands can be classified as either (a) a re-execution necessary command that is necessary to execute again when a print job halted by the interruption process is restarted, or (b) a re-execution unnecessary command that is unnecessary to execute again when a print job halted by the interruption process is restarted;
    wherein the command execution unit (a) judges whether the executed PDL command is a re-execution unnecessary command when each of the PDL commands is executed, and (b) overwrites the executed PDL command stored in the PDL command memory unit with a NOP command indicating no processing to be done if the executed PDL command is determined to be a re-execution unnecessary command;
    wherein the print job control unit controls the command execution unit to start execution of a print job specified by the print job specifying information at the head of the input job queue when the end of execution of a print job by the command execution unit is detected; and
    wherein, when an instruction for the interruption process is detected, the print job control unit (a) registers the print job specifying information which specifies the print job for the interruption process into the head of the input job queue, and (b) controls the command execution unit to halt the print job being executed and start execution of the print job for the interruption process.

2. The printing device according to claim 1, wherein, when an instruction for an interruption process is detected, the print job control unit:
    (a) waits until a PDL command of a new page command is executed by the command execution unit,
    (b) registers the print job specifying information which specifies the print job for the interruption process into the head of the input job queue, and
    (c) controls the command execution unit to halt the print job being executed and start execution of the print job for the interruption process.

3. The printing device according to claim 1, wherein the interruption process is a process for immediately executing a print job represented by newly received print data.

4. The printing device according to claim 1, wherein the interruption process is a process for immediately executing a print job specified by the print job specifying information already registered in the input job queue.

5. The print device according to claim 1, wherein:
    the re-execution necessary command contains a PDL command for designating control information for controlling actions of the printing device, and
    the re-execution unnecessary command contains a PDL command for instructing image drawing.

6. The printing device according to claim 1, wherein:
    the re-execution unnecessary command contains an image drawing command including a command part for instructing image drawing, and a data part expressing image data;
    the PDL command memory unit comprises a command memory unit for storing commands and an image data memory unit for storing image data;
    the PDL registration unit:
        (a) converts the command part of the image drawing command into an internal command, registers the internal command into the command memory unit, and registers the image data part of the image drawing command into the image data memory unit, when the PDL command included in the received print data is an image drawing command; and
        (b) registers the PDL command into the command memory unit, when the PDL command included in the received print data is not an image drawing command;
    the command execution unit, when the internal command is executed,
        (a) executes drawing of an image based on the internal command stored in the command memory unit and the image data registered in the image data memory unit, and
        (b) after execution of the internal command, overwrites the internal command in the command memory unit with the internal-command-sized NOP data indicating no process to be accomplished; and
    the command execution unit, when the re-execution unnecessary command other than the internal command is executed,
        (a) executes the re-execution unnecessary command, and
        (b) after execution of the re-execution unnecessary command, overwrites the command in the command memory unit with the command-sized NOP data.

7. The printing device according to claim 6, wherein the internal command includes information specifying the length and relative address of image data registered in the image data memory unit.

8. The printing device according to claim 6, further comprising an image data removal unit for replacing image data stored in the image data memory unit with predetermined data after execution of the internal command.

9. The printing device according to claim 1, further comprising:
a display unit that (a) displays job information showing a currently-executed print process and at least one waiting-state print process both being registered in the input job queue, and (b) identifiably displays selected job information out of the job information showing at least one waiting-state print process; and
a key unit that receives an instruction to switch the selected job information and an interruption instruction to interrupt a print process from a user;
wherein the print job control unit halts execution of the currently-executed print process and executes the interruption printing process shown by the selected job information in response to the interruption instruction received by the key unit.

10. The printing device according to claim 9, wherein the job information displayed on the display unit includes a user name.

11. The printing device according to claim 9, wherein the job information displayed on the display unit includes a job name.

12. A printing control method executed by a printing device that executes a print job based on print data supplied from electronic equipment connected via a network, and permits an interruption process by another print job during execution of the supplied print job, the printing control method comprising:
a receiver step which receives the print data which includes a series of PDL commands from the electronic equipment;
a PDL command registration step which reregisters the series of PDL commands included in the received print data into a PDL command memory unit;
a print job control step which, when the print data is received, registers print job specifying information that specifies the print job represented by the received print data to the end of an input job queue; and
a command execution step which executes the print job by successively executing the series of PDL commands stored in the PDL command memory unit from the head;
wherein each of the series of PDL commands can be classified as either (a) a re-execution necessary command that is necessary to execute again when a print job halted by the interruption process is restarted, or (b) a re-execution unnecessary command that is unnecessary to execute again when a print job halted by the interruption process is restarted;
wherein the command execution step (a) judges whether the executed PDL command is a re-execution unnecessary command when each of the PDL commands is executed, and (b) overwrites the executed PDL command stored in the PDL command memory unit with a NOP command indicating no processing to be done if the executed PDL command is determined to be a re-execution unnecessary command;
wherein the print job control step controls to start execution of a print job specified by the print job specifying information at the head of the input job queue when the end of execution of a print job by the command execution step is detected; and
wherein, when an instruction for the interruption process is detected, the print job control step (a) registers the print job specifying information which specifies the print job for the interruption process into the head of the input job queue, and (b) controls to halt the print job being executed and start execution of the print job for the interruption process.

13. The printing control method according to claim 12, further comprising:
a display step that (a) displays job information showing a currently-executed print process and at least one waiting-state print process both being registered in the input job queue, and (b) identifiably displays selected job information out of the job information showing at least one waiting-state print process;
a key receiving step which receives an instruction to switch the selected job information and an interruption instruction to interrupt a print process from a user; and
an interruption control step which halts execution of the currently-executed print process and executes the interruption printing process shown by the selected job information in response to the interruption instruction received by the key receiving step.

14. The printing control method according to claim 13, wherein the job information displayed by the display step includes a user name.

15. The printing control method according to claim 13, wherein the job information displayed by the display step includes a job name.

16. A non-transitory computer-readable recording medium having a program stored thereon for controlling a control unit of a printing device that executes a print job based on print data supplied from electronic equipment connected via a network, and permits interruption by another print job during execution of the supplied print job, wherein the program controls the control unit to function as:
a receiver which receives the print data which includes a series of PDL commands from the electronic equipment;
a PDL command registration unit which registers the series of PDL commands included in the received print data into a PDL command memory unit;
a print job control unit which, when the print data is received, registers print job specifying information that specifies the print job represented by the received print data to the end of an input job queue; and
a command execution unit which executes the print job by successively executing the series of PDL commands stored in the PDL command memory unit from the head;
wherein each of the series of PDL commands can be classified as either (a) a re-execution necessary command that is necessary to execute again when a print job halted by the interruption process is restarted, or (b) a re-execution unnecessary command that is unnecessary to execute again when a print job halted by the interruption process is restarted;
wherein the command execution unit (a) judges whether the executed PDL command is a re-execution unnecessary command when each of the PDL commands is executed, and (b) overwrites the executed PDL command stored in the PDL command memory unit with a NOP command indicating no processing to be done if the executed PDL command is determined to be a re-execution unnecessary command;
wherein the print job control unit controls the command execution unit to start execution of a print job specified by the print job specifying information at the head of the input job queue when the end of execution of a print job by the command execution unit is detected; and
wherein, when an instruction for the interruption process is detected, the print job control unit (a) registers the print job specifying information which specifies the print job for the interruption process into the head of the input job queue, and (b) controls the command execution unit to halt the print job being executed and start execution of the print job for the interruption process.

17. The non-transitory computer-readable recording medium according to claim 16, wherein the program controls the control unit to further function as:
- a display unit that (a) displays job information showing a currently-executed print process and at least one waiting-state print process both being registered in the input job queue, and (b) identifiably displays selected job information out of the job information showing at least one waiting-state print process; and
- a key unit that receives an instruction to switch the selected job information and an interruption instruction to interrupt a print process from a user;
- wherein the print job control unit halts execution of the currently-executed print process and executes the interruption printing process shown by the selected job information in response to the interruption instruction received by the key unit.

18. The non-transitory computer-readable recording medium according to claim 17, wherein the job information displayed on the display unit includes a user name.

19. The non-transitory computer-readable recording medium according to claim 17, wherein the job information displayed on the display unit includes a job name.

* * * * *